United States Patent
Kikuta

(10) Patent No.: US 9,349,083 B2
(45) Date of Patent: May 24, 2016

(54) IMAGE HALFTONE PROCESSING BY DITHERING OR ERROR DIFFUSION BASED ON PIXEL VALUE OR TIMES OF PRINTING

(71) Applicant: CANON KABUSHIKI KAISHA, Tokyo (JP)

(72) Inventor: Kyohei Kikuta, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/611,180

(22) Filed: Jan. 31, 2015

(65) Prior Publication Data

US 2015/0220824 A1    Aug. 6, 2015

(30) Foreign Application Priority Data

Feb. 6, 2014 (JP) .................................. 2014-021335
Nov. 18, 2014 (JP) .................................. 2014-233647

(51) Int. Cl.
| | |
|---|---|
| H04N 1/405 | (2006.01) |
| G06K 15/02 | (2006.01) |
| B41J 2/205 | (2006.01) |
| B41J 2/21 | (2006.01) |

(52) U.S. Cl.
CPC ........ *G06K 15/1881* (2013.01); *G06K 15/1872* (2013.01); *G06K 15/1878* (2013.01); *H04N 1/4051* (2013.01); *H04N 1/4052* (2013.01); *B41J 2/2054* (2013.01); *B41J 2/2132* (2013.01); *G06K 15/1876* (2013.01)

(58) Field of Classification Search
None
See application file for complete search history.

(56) References Cited

U.S. PATENT DOCUMENTS

| | | | |
|---|---|---|---|
| 5,121,446 A | 6/1992 | Yamada et al. | |
| 7,889,389 B2 | 2/2011 | Kakutani | |
| 8,259,357 B2* | 9/2012 | Murakami | H04N 1/4051 |
| | | | 358/1.9 |
| 8,363,251 B2 | 1/2013 | Watanabe et al. | |
| 8,477,361 B2 | 7/2013 | Marumoto | |
| 8,681,378 B2* | 3/2014 | Kakutani | H04N 1/4092 |
| | | | 358/1.9 |
| 8,824,016 B2* | 9/2014 | Nishizaki | G06K 15/1881 |
| | | | 358/3.06 |
| 9,055,251 B2* | 6/2015 | Palanivel | G06F 3/1208 |
| 2009/0244631 A1* | 10/2009 | Hansaki | H04N 1/405 |
| | | | 358/3.03 |
| 2010/0092092 A1* | 4/2010 | Sakaue | H04N 1/40062 |
| | | | 382/199 |

FOREIGN PATENT DOCUMENTS

| | | |
|---|---|---|
| JP | 02-210960 A | 8/1990 |
| JP | 2008-006591 A | 1/2008 |
| JP | 2008-265354 A | 11/2008 |
| JP | 2009-262455 A | 11/2009 |

* cited by examiner

*Primary Examiner* — Scott A Rogers
(74) *Attorney, Agent, or Firm* — Fitzpatrick, Cella, Harper & Scinto

(57) ABSTRACT

An image processing apparatus that generates image data for forming an image by performing printing a plurality of times on the same area of a printing medium. The image processing apparatus includes: a division unit configured to divide the image data into first image data and second image data by comparing a pixel value indicating a density of a pixel with a predetermined threshold value for each pixel constituting the image data so that the first image data includes pixels whose pixel value is equal to or greater than the predetermined threshold value and the second image data includes pixels whose pixel value is less than the threshold value; a first halftone processing unit configured to perform dither processing on the first image data; and a second halftone processing unit configured to perform error diffusion processing on the second image data.

20 Claims, 20 Drawing Sheets

| 0 | 8 | 2 | 10 |
|---|---|---|---|
| 12 | 4 | 14 | 6 |
| 3 | 11 | 1 | 9 |
| 15 | 7 | 13 | 5 |

FIG.8

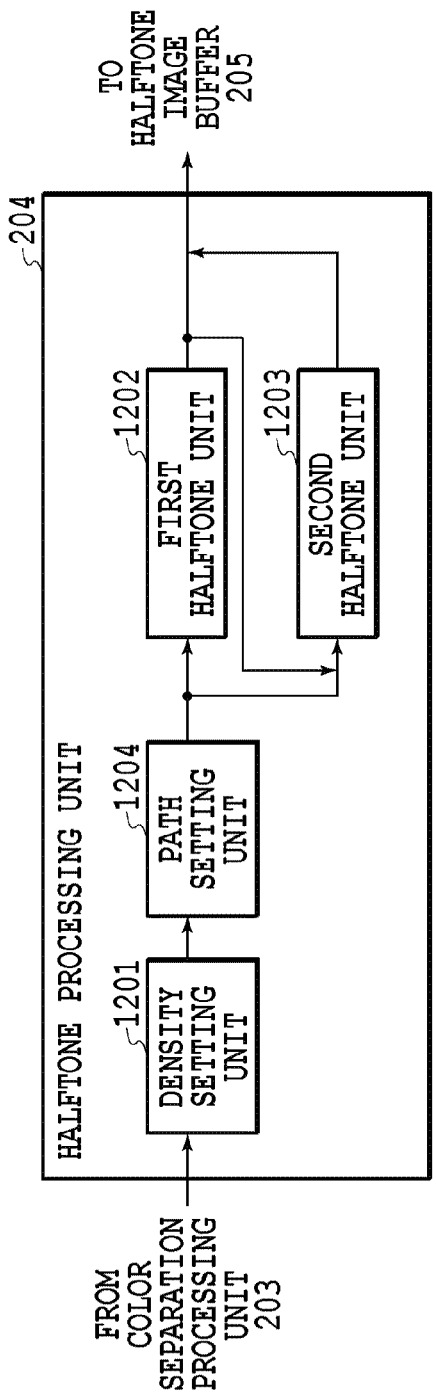
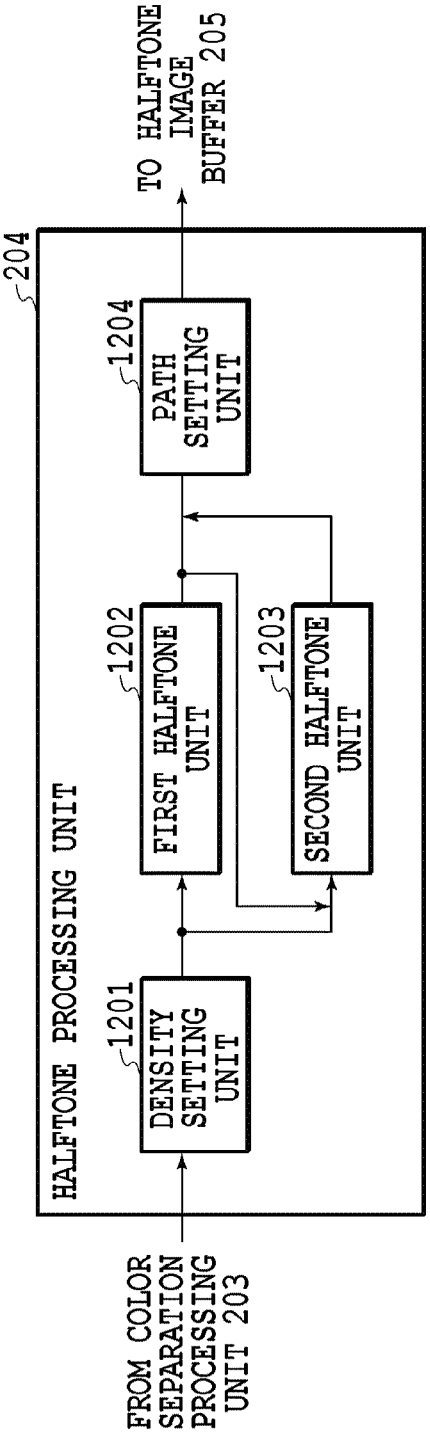

IMAGE HALFTONE PROCESSING BY DITHERING OR ERROR DIFFUSION BASED ON PIXEL VALUE OR TIMES OF PRINTING

BACKGROUND OF THE INVENTION

1. Field of the Invention

The present invention relates to a halftone method of representing a shade of an image with a limited number of tone levels and a method of printing the shade on a printing medium.

2. Description of the Related Art

An image forming apparatus that forms an image on a printing medium, such as paper, by using a color material is used often as an apparatus that outputs an image on which processing has been performed by a personal computer, an image that has been photographed by a digital camera, etc. The number of tone levels that can be output of the image forming apparatus such as this is generally small compared to the number of tone levels of an image that is handled by a personal computer etc. Because of this, in the case where an image is output by an image forming apparatus, it is necessary to decrease the number of tone levels to the number of tone levels that the image forming apparatus can output by performing gradation conversion processing (halftone processing) on image data that is handled by a personal computer etc. As representative halftone processing, the dither method and the error diffusion method are known. Generally, the dither method is known as high-speed processing whose burden of processing is light and which can be performed in parallel. On the other hand, the error diffusion method is known as a method of obtaining an output with less feeling of granularity, more excellent frequency responsiveness, and of higher image quality compared to that obtained by the dither method, but it is difficult to perform the error diffusion method in parallel and high-speed processing of the error diffusion method is more difficult to implement compared to the dither method.

As one of the systems of an image forming apparatus that forms an image on a printing sheet by attaching a color material to the printing sheet, there is an ink jet printing system. In the ink jet printing system, it is known that an image of higher quality is obtained in the case where dots of the color material (ink) that are formed on the printing sheet are more highly dispersed. Further, in the ink jet printing system, it is known that an image of higher quality is obtained in the case where ink dots are more highly dispersed in each printing (in each path) in the system in which an image is formed by repeatedly performing printing a plurality of times on the same area (called a multipath system etc.). The reason is that, in the case where the ink is lowly dispersed, i.e., the ink is ejected concentratedly, the ink aggregates on the printing medium and an unintended dot arrangement results or ink droplets become large and there are produced areas where dots are dense and where dots are sparse on the entire printing medium. Because of this, a technique for dispersing dots in each printing (each path) in order to prevent ink dots from aggregating has been proposed (see Japanese Patent Laid-Open No. 2008-006591 and Japanese Patent Laid-Open No. 2009-262455).

SUMMARY OF THE INVENTION

Japanese Patent Laid-Open No. 2008-006591 has disclosed the technique for preventing dots from aggregating by means of the halftone processing using the dither method and for making the dot arrangement highly dispersive. However, this technique will make the image quality of an image that is ultimately formed on a printing medium by repeating printing inferior to that which is obtained by using the error diffusion method.

On the other hand, Japanese Patent Laid-Open No. 2009-262455 has disclosed the technique for achieving a higher degree of dot dispersiveness by performing halftone processing using the error diffusion method in each printing (each path). By using this technique, it is possible not only to achieve dot dispersiveness in each printing (each path) but also to maintain image quality of an image that is ultimately formed by repeating printing, but there remains such a problem that processing takes time because performing the processing in parallel is difficult.

The image processing apparatus according to the present invention is an image processing apparatus that generates image data for forming an image by performing printing a plurality of times on the same area of a printing medium, and has a division unit configured to divide the image data into first image data and second image data by comparing a pixel value indicating a density of a pixel with a predetermined threshold value for each pixel constituting the image data so that the first image data includes pixels whose pixel value is equal to or greater than the predetermined threshold value and the second image data includes pixels whose pixel value is less than the threshold value, a halftone processing unit configured to perform dither processing on the first image data, and a second halftone processing unit configured to perform error diffusion processing on the second image data.

According to the present invention, in the case where an image is formed by the ink jet printing system using the multipath system, it is possible to achieve not only dot diffusiveness in each printing (each path) but also image quality of a formed image while keeping a high speed by reducing the load of processing.

Further features of the present invention will become apparent from the following description of exemplary embodiments (with reference to the attached drawings).

BRIEF DESCRIPTION OF THE DRAWINGS

FIG. 8 is a diagram showing an example of a threshold value matrix that is used in the dither processing;

FIGS. 12A and 12B are block diagrams showing an internal configuration of a halftone processing unit according to a fourth embodiment;

DESCRIPTION OF THE EMBODIMENTS

Hereinafter, with reference to the attached drawings, preferred embodiments of the present invention are explained. Configurations shown in the following embodiments are just examples and the present invention is not limited to the illustrated configurations.

First Embodiment

Figure 1:
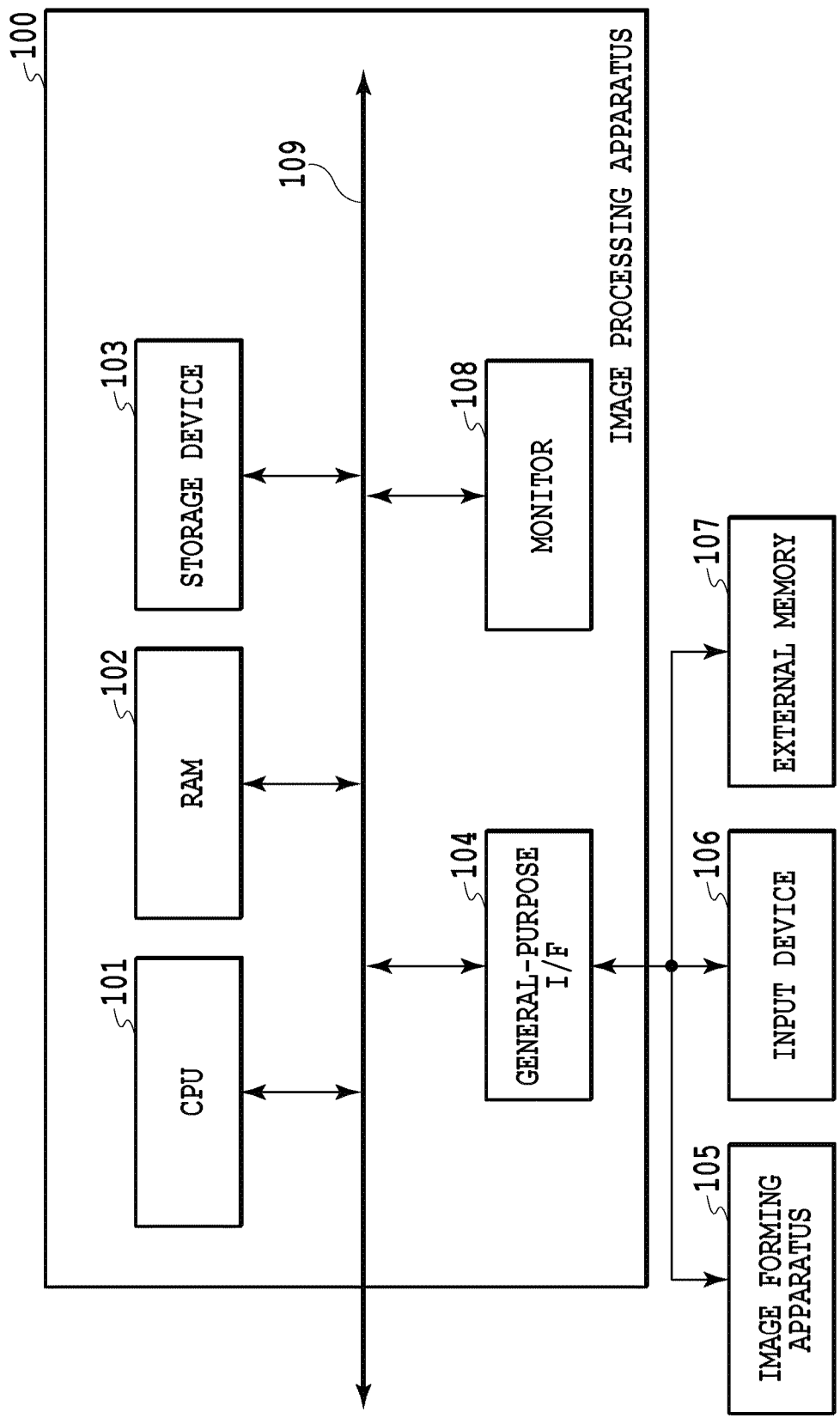
FIG. 1 is a diagram showing a hardware configuration of an image processing apparatus according to a first embodiment.

FIG. 1 is a diagram showing a hardware configuration of an image processing apparatus according to the present embodiment. An image processing apparatus 100 includes a CPU 101, a RAM 102, a storage device 103, a general-purpose interface (I/F) 104, a monitor 108, and a main bus 109.

The general-purpose I/F 104 connects an image forming apparatus 105, an input device 106, such as a mouse and a keyboard, and an external memory 107, such as a memory card, to the main bus 109.

The CPU 101 activates an image processing application stored in the storage device 103, such as a ROM, and an HDD, and develops the image processing application onto the RAM 102. Then, data necessary for image processing, such as various kinds of data stored in the storage device 103 or in the external memory 107 and instructions from the input device 106, are transferred to the RAM 102. Further, in accordance with the image processing application, the data stored in the RAM 102 is subjected to processing based on commands from the CPU 101. The results of the arithmetic operation are displayed on the monitor 108 or stored in the storage device 103 or in the external memory 107.

In the present embodiment, the image processing apparatus 100 and the image forming apparatus 105 are independent of each other, but a configuration in which the image forming apparatus 105 includes the image processing apparatus 100 may be accepted.

In the following, various kinds of image processing that are implemented by the CPU 101 causing various kinds of software (computer programs) stored in the storage device 103 to run are explained.

Figure 2:
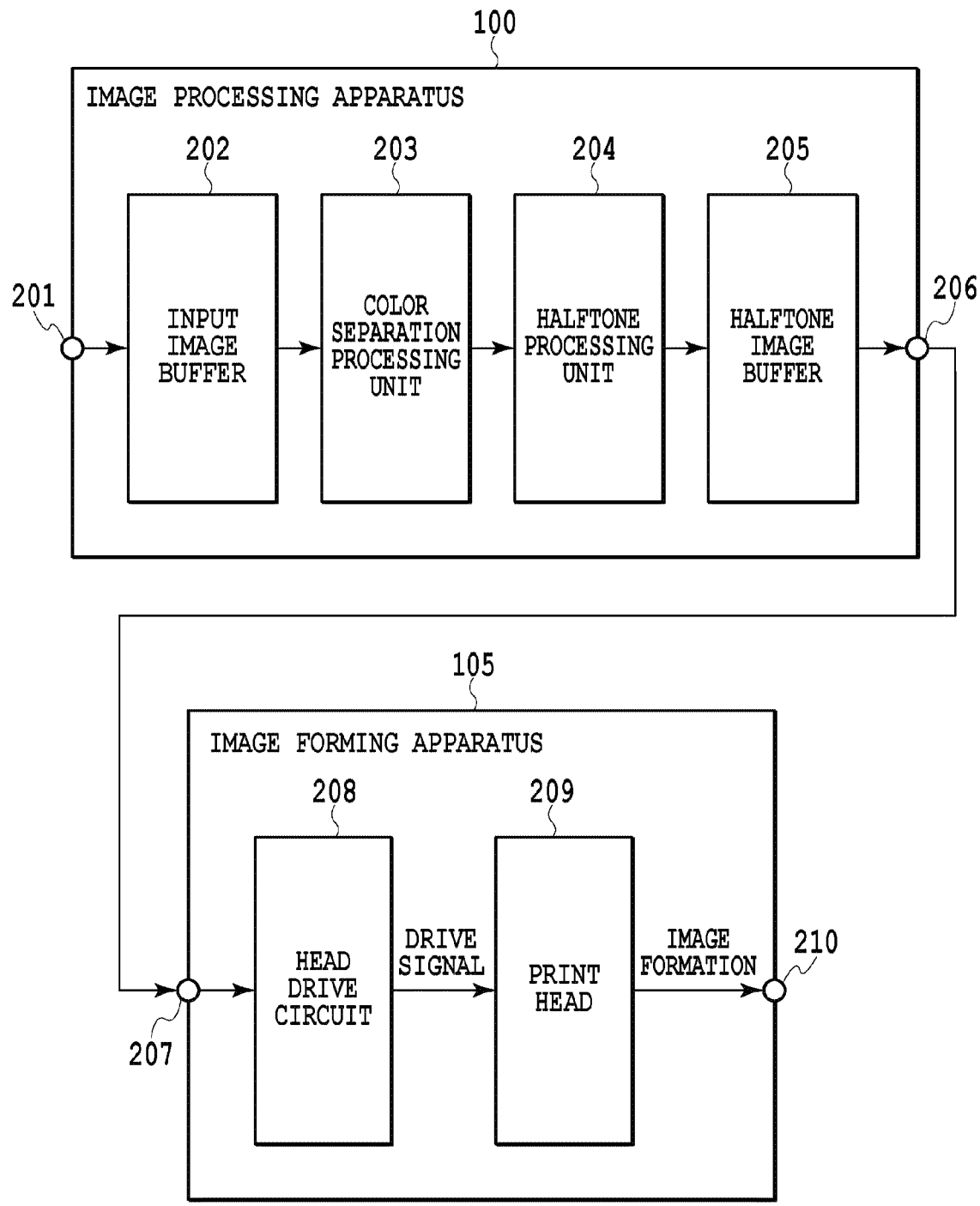
FIG. 2 is a function block diagram showing the image processing apparatus and a logic configuration of an image forming apparatus.

FIG. 2 is a function block diagram showing a logic configuration of the image processing apparatus 100 and the image forming apparatus 105. The image processing apparatus 100 has an input terminal 201, an input image buffer 202, a color separation processing unit 203, a halftone processing unit 204, a halftone image buffer 205, and an output terminal 206. The image forming apparatus 105 has an input terminal 207, a head drive circuit 208, a print head 209, and an output terminal 210.

First, each unit of the image processing apparatus 100 is explained.

The input image buffer 202 stores color image data to be printed, which is input from the input terminal 201 (hereinafter, input image data). Here, it is assumed that the input image data includes three color components: red (R), green (G), and blue (B).

The color separation processing unit 203 separates the input image data stored in the input image buffer 202 into image data corresponding to the colors of the color materials included in the image forming apparatus 105. This color separation processing is performed by referring to a color separation lookup table (not shown). In the present embodiment, explanation is given by using a single color of black (K) as an example. In the case where a color image is formed on a printing medium, it is sufficient to perform color separation processing on a plurality of colors, such as cyan (C), magenta (M), yellow (Y), and black (K). In the present embodiment, explanation is given on the assumption that the image data after the color separation processing is multivalued 8-bit data representing 256 tone levels (data of 0 to 255, where 0 represents white), but it may also be possible to perform conversion into a larger number of gradations.

The halftone processing unit 204 performs halftone processing on image data after the color separation processing. By the halftone processing, the image after the color separation processing is converted into halftone image data having the number of tone levels that the image forming apparatus 105 can output. Here, it is assumed that the number of gradations that can be output is two indicating the on and off states of a dot, respectively. In other words, the multivalued image data after the color separation processing that is represented by eight bits is converted into binary image data. Details of the halftone processing will be described later. In the case where the image forming apparatus 105 can perform printing by inks having the same color tone but different densities, or can print dots whose size are different, the number of tone levels that can be output may be three or more. The obtained halftone image data is sent to the halftone image buffer 205 and is stored therein. Then, the halftone image data stored in the halftone image buffer 205 is output to the image forming apparatus 105 from the output terminal 206.

The input image data is not limited to image data having the above-described RGB color components, but may be image data having, for example, CMYK color components.

Next, each unit of the image forming apparatus 105 is explained. The image forming apparatus 105 forms an image on a printing medium by causing the print head 209 to relatively move with respect to the printing medium to perform a scan a plurality of times based on the halftone image data received from the image processing apparatus 100. Here, it is assumed that the print head 209 adopts the ink jet system and has one or more printing elements (nozzles).

The head drive circuit 208 generates a drive signal for controlling the print head 209 based on the halftone image data that is input via the input terminal 207.

The print head 209 prints an image by forming dots by using the color material on the printing medium based on the generated drive signal. In the present embodiment, it is assumed that printing of an image is performed by the multipath system. The color materials may include alight cyan (Lc) ink, a light magenta (Lm) ink, a spot color ink, and a transparent ink, not limited to a K ink or CMYK inks. It may also be possible to perform such processing to cure the ink by irradiating the ink with light (ultraviolet ray) after ejecting the ink.

Next, the multipath system that is the image printing method supposed by the present embodiment is explained.

Figure 3:
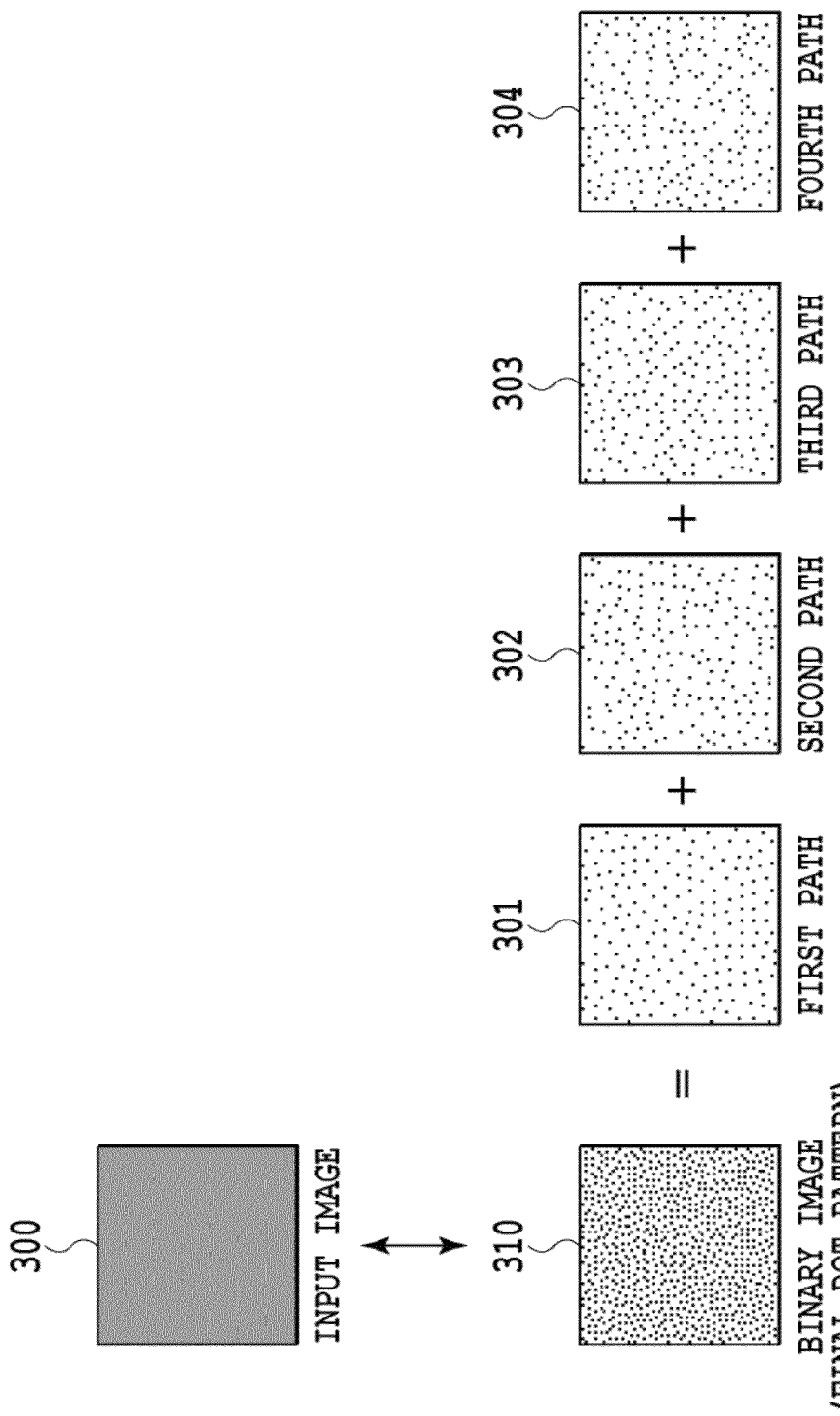
FIG. 3 is a schematic diagram explaining printing by the multipath system.

The ink jet image forming apparatus frequently adopts the multipath system in which an image is formed by repeatedly performing printing a plurality of times on the same area of a printing medium. FIG. 3 is a schematic diagram explaining printing by the multipath system. Here, it is assumed that an input image 300 is, for example, a multi-tone-level image that is formed by a black color ink and in which the density is uniform. Here, it is assumed that the density of the input image 300 is 50/255. By the halftone processing, the input image 300 is converted into a binary image 310 having the number of tone levels that the image forming apparatus can output. In the case where the ratio of the area occupied by the total number of black dots (ON dots) arranged dispersedly in the binary image 310 at this time to the total area is 50/255, the density will be approximate to that of the input image 300. In the multipath system, the binary image 310 is not formed on the printing medium at a time, but printing is performed stepwise repeatedly as shown in 301 to 304 and the binary image 310 is formed ultimately (the binary image 310 is formed as an accumulation of printing of 301 to 304). The printing performed once by the print head relatively moving with respect to the printing medium is called a path. The example in FIG. 3 shows the multipath system including four paths, i.e., a first path (301), a second path (302), a third path (303), and a fourth path (304), in which printing is performed four times in total. Here, the binary image 310 is the image that is ultimately printed on the printing medium, and therefore, is also called the final image or the final dot pattern.

Figure 4A:
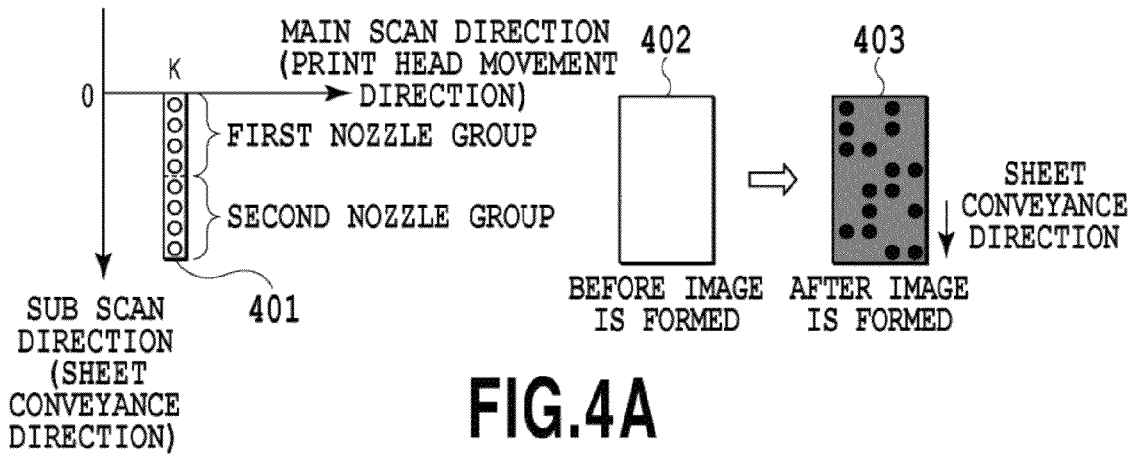
FIGS. 4A to 4G are diagrams explaining a specific method of performing printing by the multipath system along with the behavior of a print head.

FIGS. 4A to 4G are diagrams explaining a specific method of performing printing by using the multipath system, along with the behavior of the print head. For convenience of explanation, the case where there are two paths is shown, but the way of thinking is the same even in the case where there are more paths. FIG. 4A schematically shows elements necessary for explanation and FIGS. 4B to 4F each show states in respective behaviors as the state develops.

In FIG. 4A, a print head 401 having eight K ink nozzles includes a first nozzle group (four upper nozzles) and a second nozzle group (four lower nozzles). The top end of the print head 401 is taken to be the origin in the sub scan direction (the conveyance direction of paper (printing medium), the longitudinal direction in FIG. 4A). It is assumed that the print head 401 does not move in the sub scan direction but repeats reciprocating motion in the main scan direction (the transverse direction in FIG. 4A). A printing medium 402 represents a state before an image is formed by the image forming apparatus. For simplicity, it is assumed that the length in the longitudinal direction of the printing medium is the same as that of the print head 401 and the printing medium has a width corresponding to four dots in the transverse direction. A printing medium 403 represents a state where image formation is completed.

In the multipath system, an image is formed by alternately performing printing while moving the print head 401 and the conveyance of the printing medium.

Figure 4B:
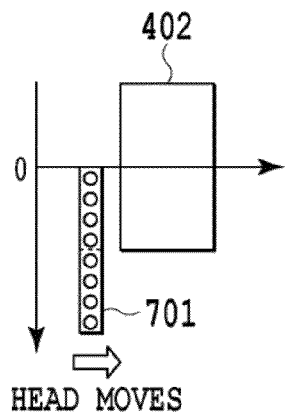

As shown in FIG. 4B, first, the printing medium 402 before an image is formed and the print head 401 are set in the initial positions. After image formation starts, the print head 401 moves in the main scan direction from the initial position and the state changes into a state shown in FIG. 4C. At this time, in the process in which the print head 401 passes on the lower half of the printing medium, on the lower half of the printing medium, part of the image is printed by the first nozzle group (shown in light gray). What is printed on the lower half of the printing medium at this time is the dot pattern of the first path.

Figure 4C:
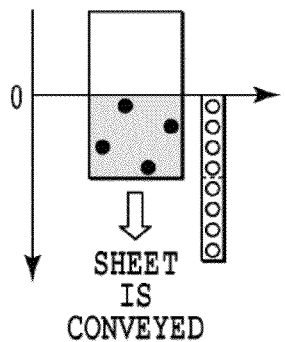
Figure 4D:
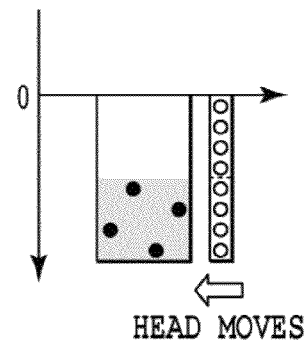

Next, from the state in FIG. 4C, the printing medium is moved in the sub scan direction by a distance corresponding to the number of nozzles of the nozzle group (i.e., a distance corresponding to four nozzles). FIG. 4D shows the state after the movement.

Figure 4E:
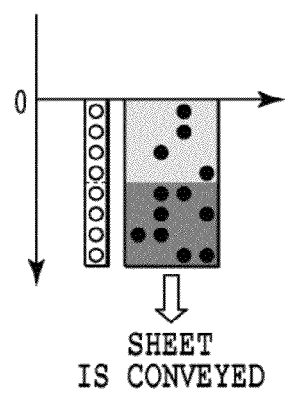

Next, the print head 401 is moved to the left in the main scan direction and the state changes into the state in FIG. 4E. During this movement also, ink is ejected in the process in which the print head 401 passes on the printing medium and thus printing is performed. Due to this, on the lower half of the printing medium, the dot pattern of the second path is superimposed (shown in dark gray) by the second nozzle group and the image formation on the lower half of the printing medium is completed. On the other hand, on the upper half of the printing medium, the dot pattern of the first path (shown in light gray) by the first nozzle group is printed.

Figure 4F:
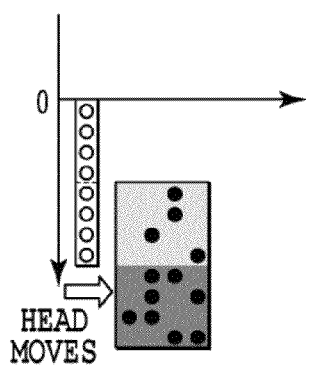

Then, from the state in FIG. 4E, the printing medium is moved again by a distance corresponding to the number of nozzles of the nozzle group (a distance corresponding to four nozzles) in the sub scan direction and the state is brought into the state in FIG. 4F, which is the state where the print head 401 is ready to scan to the right again.

Figure 4G:
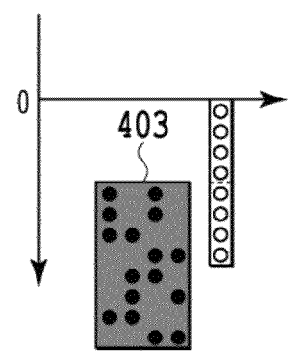

Further, ink is ejected while the print head 401 is moved in the main scan direction this time (the state in FIG. 4G). Due to this, on the upper half of the printing medium also, the dot pattern of the second path by the second nozzle group is superimposed and the printing medium 403 in the state where the image formation is completed is obtained.

Here, explanation is given in the case where there are two paths, but in the case where a print head having M nozzles is used and there are n paths, the M nozzles are divided into nozzle groups each having M/n nozzles in order from the top and printing and conveyance are performed for each nozzle group. The first nozzle group prints a dot pattern of the first path in the corresponding position on the printing medium, the second nozzle group prints a dot pattern of the second path in the corresponding position on the printing medium, and this continues until the nth nozzle group prints a dot pattern of the nth path. In contrast to this, on the printing medium, a partial image is formed stepwise from the lower area of the printing medium and in every area, what is printed first is the dot pattern of the first path and then, the dot patterns of the second, third, and the nth paths are superimposed in order. In the above-described explanation, in the scan in the main scan direction by the print head 401, printing (ejection of ink) is performed in the scan both in the rightward direction and in the leftward direction, but the direction in which printing is performed may be limited to one of the directions.

One of the reasons that the multipath system is adopted is that a large amount of ink is supplied to the printing medium in a brief period of time in the single path system in which printing is performed by one scan, and therefore, excessive blurring, an excessive drying time, and wrinkles (warps) of the printing medium will be caused. Further, in the single path system, in the case where a defective nozzle or a nozzle whose position is deviated exists, there is such a problem that there is a case where noise in the form of a white streak across both ends on the printing medium occurs or a case where printing is not performed sufficiently, and therefore, a desired degree of color saturation is not obtained. In the multipath system, those problems can be dealt with, but for the same reason, preferably, the degree of dispersiveness in the dot arrangement in each path is high.

Figure 5:
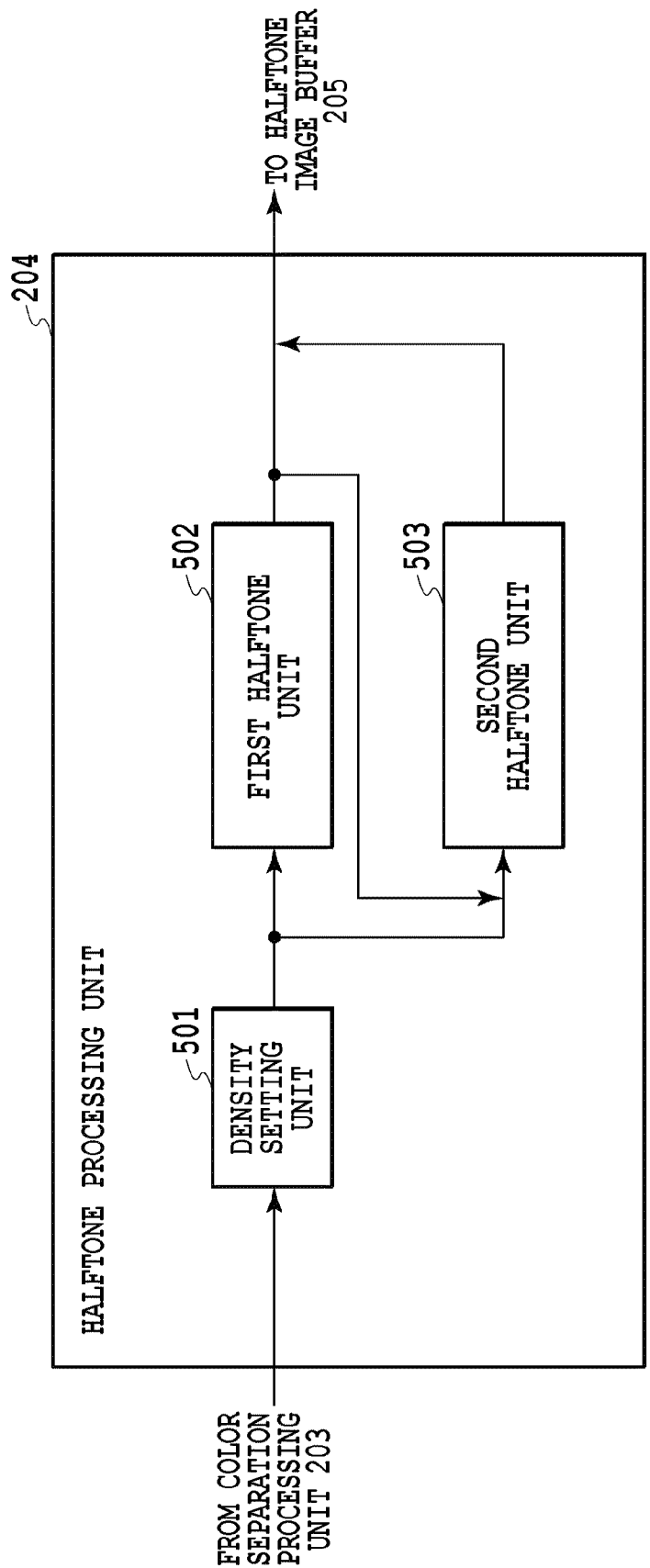
FIG. 5 is a block diagram showing an internal configuration of a halftone processing unit according to the first embodiment.

The halftone processing unit 204 according to the present embodiment that supposes the above-described multipath system is explained. One of the features of the halftone processing unit 204 according to the present embodiment is that the halftone processing unit 204 receives the image data after the color separation processing and determines the dot pattern of each path by switching the halftone processing to another in accordance with the path. In other words, in the case where printing is performed a plurality of times (N times) by using the same color material, the halftone processing is switched to another for each path. In the present embodiment, explanation is given in the case of the multipath system including four paths. Further, it is assumed that the halftone processing to perform the dither processing is performed on the first to third paths and the halftone processing to perform the error diffusion processing is performed on the fourth path. In other words, the dither processing whose processing burden is light and which is suitable to parallelization is allocated to the preceding paths of the four paths and the error diffusion processing whose processing burden is comparatively heavy is allocated to the subsequent path. Due to this, it is possible to secure the time for the error diffusion processing of the fourth path whose processing burden is heavy while performing the dither processing on the first to third paths, and therefore, the total image processing time becomes short and it is made possible to perform image formation without delay. FIG. 5 is a block diagram showing an internal configuration of the halftone processing unit 204 according to the present embodiment.

A density setting unit 501 sets a density range for performing halftone processing of each path. In the case where the total number of paths is taken to be N, then, the paths for dither processing are expressed by first path to (N−α)th path and the paths for error diffusion are expressed by (N−α+1)th path to Nth path. In the case of the present embodiment in which the dither processing is performed on the first to third paths and the error diffusion processing is performed on the fourth path, N=4 and α=1. In this manner, in the present embodiment, the density range on which the dither processing is performed and the density range on which the error diffusion processing is performed are set for the pixel value of each pixel constituting the image data after the color separation by the density setting unit 501. In other words, the density setting unit 501 functions as a unit configured to divide the image data after the color separation into image data including pixel values less than a predetermined threshold value and image data including pixel values equal to or greater than the threshold value in a predetermined ratio.

A first halftone unit 502 determines dot patterns of the first to third paths by performing the dither processing on the image in the density range set by the density setting unit 501.

A second halftone unit 503 determines a dot pattern of the fourth path by performing the error diffusion processing on the image in the density range set by the density setting unit 501.

Figure 6:
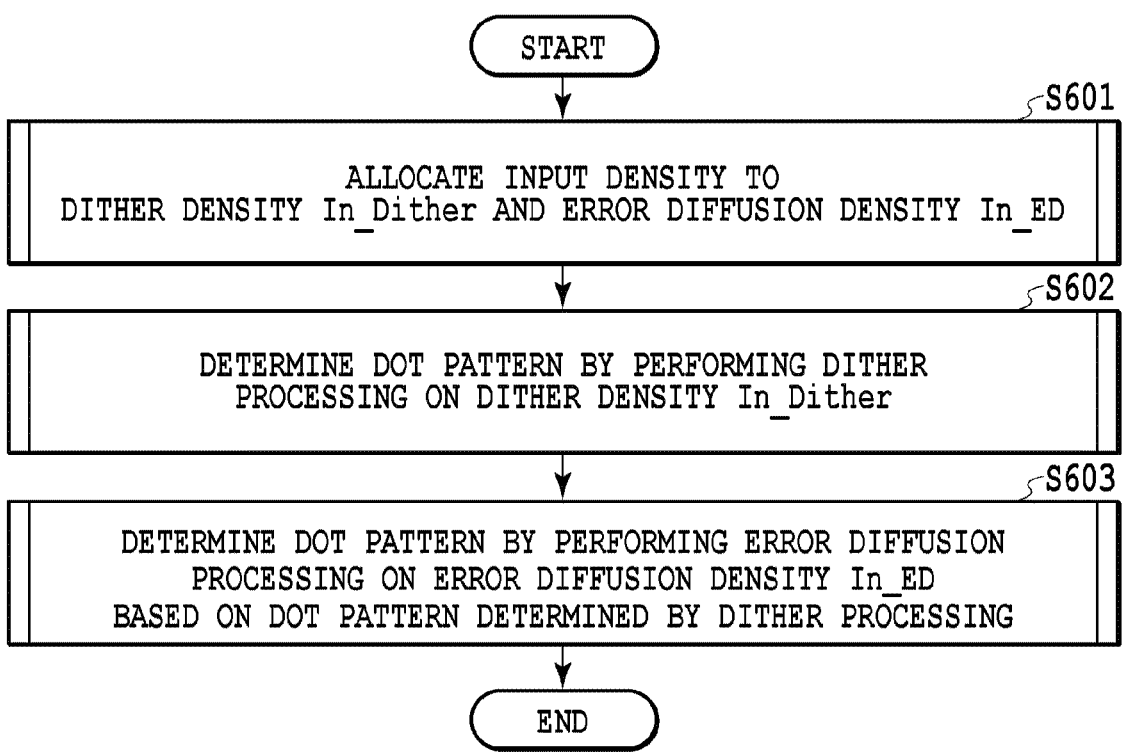
FIG. 6 is a flowchart showing a flow of halftone processing in the first embodiment.

FIG. 6 is a flowchart showing a flow of halftone processing in the present embodiment. The series of processing is performed by the CPU 101 executing computer executable programs in which procedures shown below are described after reading the programs from the storage device 103 onto the RAM 102.

Upon receipt of image data on which the color separation processing has been performed, the density setting unit 501 sets a density range for the processing by the first halftone unit and a density range for the processing by the second halftone unit of the density range possessed by the input image at step 601. Specifically, the density setting unit 501 sets a density In_Dither for the paths on which the dither processing is performed (in the present embodiment, the first to third paths) and a density In_ED for the path on which the error diffusion processing is performed (in the present embodiment, the fourth path) in accordance with the density of the input image. Each density is found by expression (1) below.

$$\begin{cases} \text{In\_ED}(x, y) = \min(In(x, y), \text{MAX\_IN\_ED}) \\ \text{In\_Dither}(x, y) = In(x, y) - \text{In\_ED}(x, y) \end{cases} \quad \text{expression (1)}$$

Here, In (x, y) indicates the density value in a pixel of interest (x, y) having an input density In and min (In (x, y), MAX_IN_ED) indicates that either In (x, y) or MAX_IN_ED, whichever is smaller value, is taken. MAX_IN_ED is a constant indicating a predetermined density value and here MAX_IN_ED is set to 64 (MAX_IN_ED=64). In other words, the above-described expression (1) means that density values less than the predetermined density value (0 to 64) of the input density In are allocated to the error diffusion density In_ED and density values equal to or greater than the predetermined value (65 to 255) are allocated to the dither density In_Dither. Consequently, the error diffusion is performed for the density range of low densities of the input density and the dither processing is performed for the density range of high densities. This is performed for all the pixels of the input image (in the case where the width of the image is taken to be W and the height to be H, x=0 to W−1, y=0 to H−1) and thereby the density In_Dither for the first to third paths and the density In_ED for the fourth path are set. In the case where the input density In of the pixel of interest (x, y) is less than a predetermined density value (e.g., 40), all the input densities In are the error diffusion processing density In_ED and the dither density In_Dither will be "0".

Figure 7:
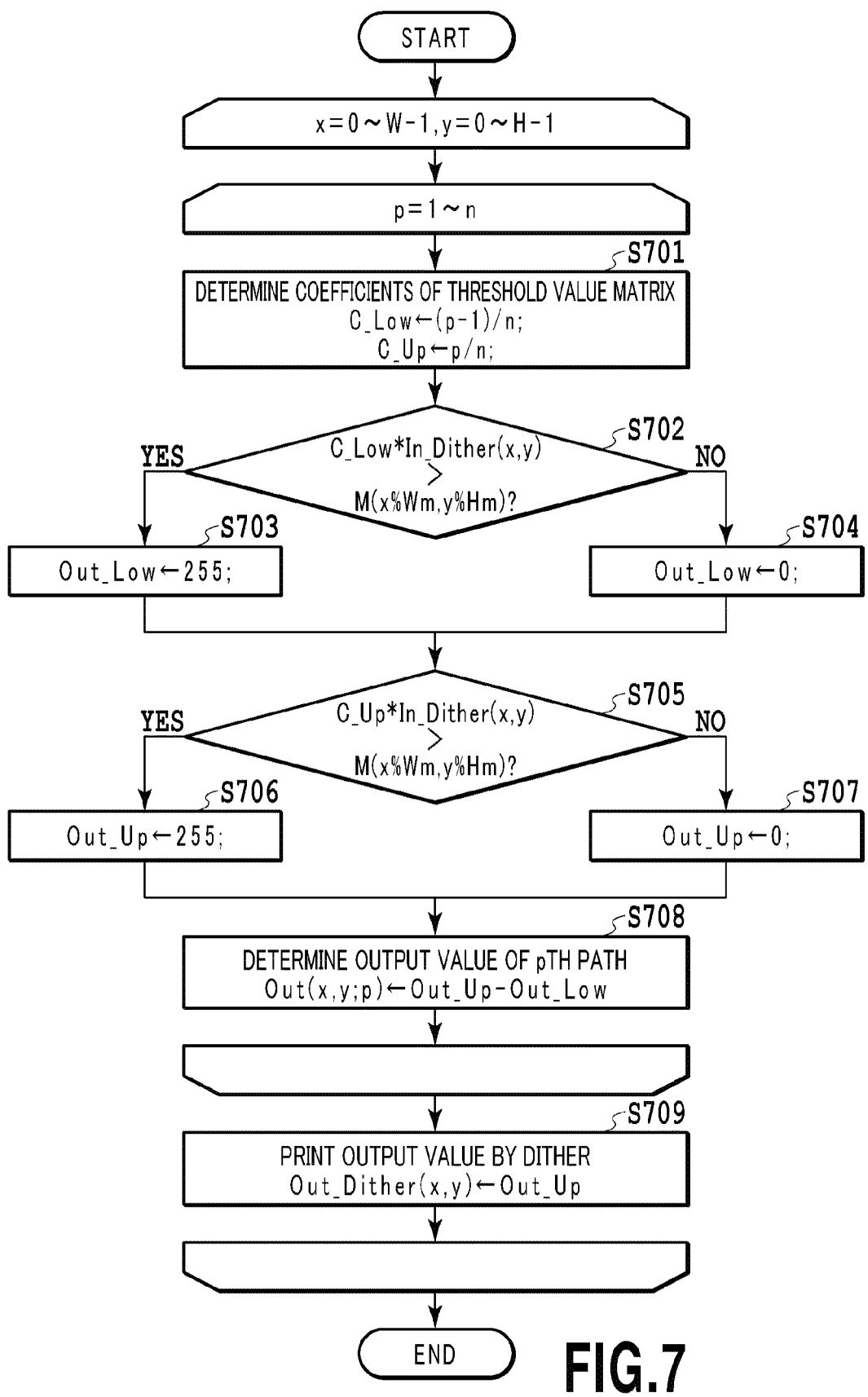
FIG. 7 is a flowchart showing details of dither processing.
Figure 8:
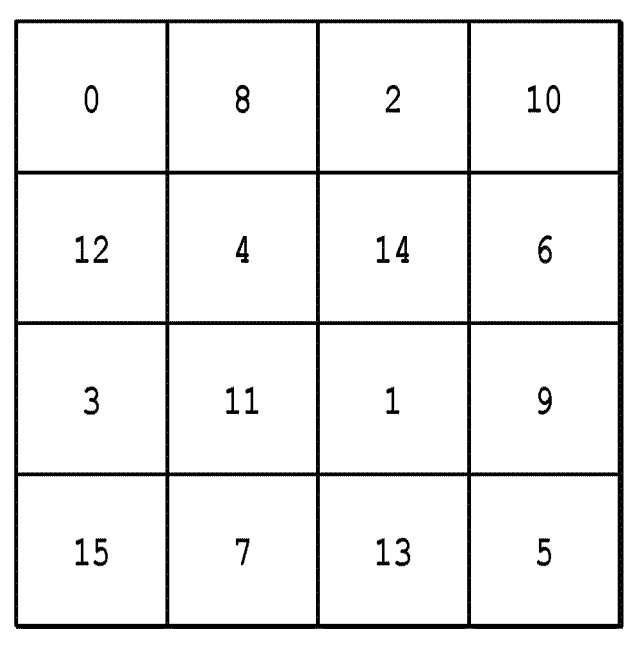

At step 602, the first halftone unit 502 performs the dither processing on the dither density In_Dither set at step 601 and determines dot patterns of the first to third paths. FIG. 7 is a flowchart showing details of the dither processing at this step. Before explaining the flowchart in FIG. 7, the dither processing is explained briefly. FIG. 8 is an example of a threshold value matrix that is used in the dither processing, a threshold value matrix in the case where a width Wm=4, a height Hm=4, and input values (tone level values) are 0 to 16. In the cell corresponding to each pixel, a value indicating a threshold value is stored. Usually, in the dither processing, an input value is compared with the threshold value in such a threshold value matrix and, for example, rules are determined in advance such that "in the case where the input value is greater than the threshold value, the dot is turned on and in the case where the input value is equal to or less than the threshold value, the dot is turned off", and then gradation conversion is performed based on the rules. Then, in the case where the size of the input image is larger than that of the threshold value matrix, the threshold value matrix is used as a tile repeatedly to fill in the input image (in a tiling manner). These rules are summarized and expressed as expression (2) below.

$$\begin{cases} \text{In\_Dither}(x, y) > M(x\%Wm, y\%Hm) \\ \quad \Rightarrow \text{Out\_Dither}(x, y) = 255 \\ \text{In\_Dither}(x, y) \leq M(x\%Wm, y\%Hm) \\ \quad \Rightarrow \text{Out\_Dither}(x, y) = 0 \end{cases} \quad \text{expression (2)}$$

In the above-described expression (2), M (x, y) indicates the threshold value stored in the cell specified by the coordinates (x, y) of the threshold value matrix and Out_Dither (x, y) indicates the output value at that time. Further, x % Wm indicates a remainder in the case where x is divided by Wm and y % Hm indicates a remainder in the case where y is divided by Hm. In the case where processing is performed on the input image by using the threshold value matrix such as this, as the input value increases, the ratio of dots that are turned on increases, and therefore, binarization results corresponding to the input density are obtained. The above is an outline of the dither processing.

With the above in mind, the dither processing at step 602 is explained in accordance with the flowchart in FIG. 7. Here, it is assumed that the number of paths on which the dither processing is performed is taken to be n=N−α (=3) and a dot pattern of a pth path (p=1, 2, 3) is determined.

At step 701, the first halftone unit 502 determines C_Low and C_Up, which are coefficients for separating output results into each path. These two coefficients are coefficients for allocating the density range allocated to the first halftone unit 502 to each path of the first halftone unit 502. These two coefficients are found by expression (3) below.

$$\begin{cases} \text{C\_Low} = (p-1)/n \\ \text{C\_Up} = p/n \end{cases} \quad \text{expression (3)}$$

At step 702, the first halftone unit 502 compares the dither density In_Dither (x, y) in the pixel of interest (x, y) multiplied by the coefficient C_Low of the two determined coefficients with the predetermined threshold value matrix M (x % Wm, y % Hm). In the case where the comparison results are true (in the case where the input value multiplied by the coefficient is greater than the threshold value), the processing proceeds to step 703. On the other hand, in the case where the comparison results are false (in the case where the input value multiplied by the coefficient is equal to or less than the threshold value), the processing proceeds to step 704.

At step 703, the first halftone unit 502 sets the value of Out_Low to 255 (ON dot).

At step 704, the first halftone unit 502 sets the value of Out_Low to 0 (OFF dot).

At step 705, the first halftone unit 502 compares the dither density In_Dither in the pixel of interest (x, y) multiplied by the coefficient C_Up of the two determined coefficients with the predetermined threshold value matrix M (x % Wm, y % Hm). In the case where the comparison results are true (in the case where the input value multiplied by the coefficient is greater than the threshold value), the processing proceeds to step 706. On the other hand, in the case where the comparison results are false (in the case where the input value multiplied by the coefficient is equal to or less than the threshold value), the processing proceeds to step 707.

At step 706, the first halftone unit 502 sets the value of Out_Up to 255 (ON dot).

At step 707, the first halftone unit 502 sets the value of Out_Up to 0 (OFF dot).

Each piece of the processing at step 702 to 707 described above is the same as the basic dither processing except for the multiplication of the coefficient C_Low or C_Up.

At step 708, the first halftone unit 502 determines the output value of the pth path. Specifically, the first halftone unit 502 determines the value obtained by subtracting the value of Out_Low from the value of Out_Up to be the output value. Out (x, y; p) obtained in this manner is the output value in the pixel of interest (x, y) of the pth path.

The processing such as above is repeated the number of times corresponding to the number of paths to which the dither processing is applied (here, three times corresponding to the three paths of the first to third paths).

The reason that the processing such as this is performed is as follows.

First, in the processing of the pth path, the coefficient C_Up is greater than the coefficient C_Low. By comparing each input value multiplied by the coefficient with the threshold value, the results of C_Up at step 705 to step 707 will include all the dots by the results of C_Low at step 702 to step 704, and the output will be such that the number of dots is larger than that of the results of C_Low. On the other hand, in the case where the processing of the (p−1)th path and that of the pth path are compared, C_Up of the (p−1)th path and C_Low of the pth path agree with each other, and therefore, the results of C_Low are equal to the results of the processing of C_Up of the previous path. Here, in the processing of the first path, C_Low=0, and therefore, Out_Low is 0 without exception. In other words, in the first path, dots of only part of input values are turned on by the dither processing and in the second and subsequent paths, the dot in the position where the dot has already been turned on in the previous path is turned off while extending the range of the input value for which the processing is performed. In the nth path, C_Up=1, and therefore, the accumulated dot pattern of the first path to the nth path will agree with the dither density In_Dither on which the dither processing is performed. In other words, by performing the processing described above, the results of performing the dither processing on the dither density In_Dither that are divided to each of the first to nth paths are obtained.

At step 709, the first halftone unit 502 prints the value of Out_Up in Out_Dither (x, y) as the output value by the dither processing. In Out_Up at this point of time, the results of performing the dither processing on the dither density In_Dither as described above are stored. Because of this, Out_Dither (x, y) will be data indicative of whether or not a dot (ON dot) has occurred in the pixel of interest (x, y) by the dither processing.

The above is the contents of the dither processing at step 602. In this manner, the pixel in which a dot is determined to be placed in the preceding first to third paths by the dither processing will not be cancelled by the error diffusion processing that is performed on the subsequent fourth path. Consequently, once the dot arrangements of the first to third paths are determined, it is possible to start printing by the first to third paths without the need to wait for the halftone processing of the fourth path.

Explanation is returned to the flowchart in FIG. 6.

Figure 9:
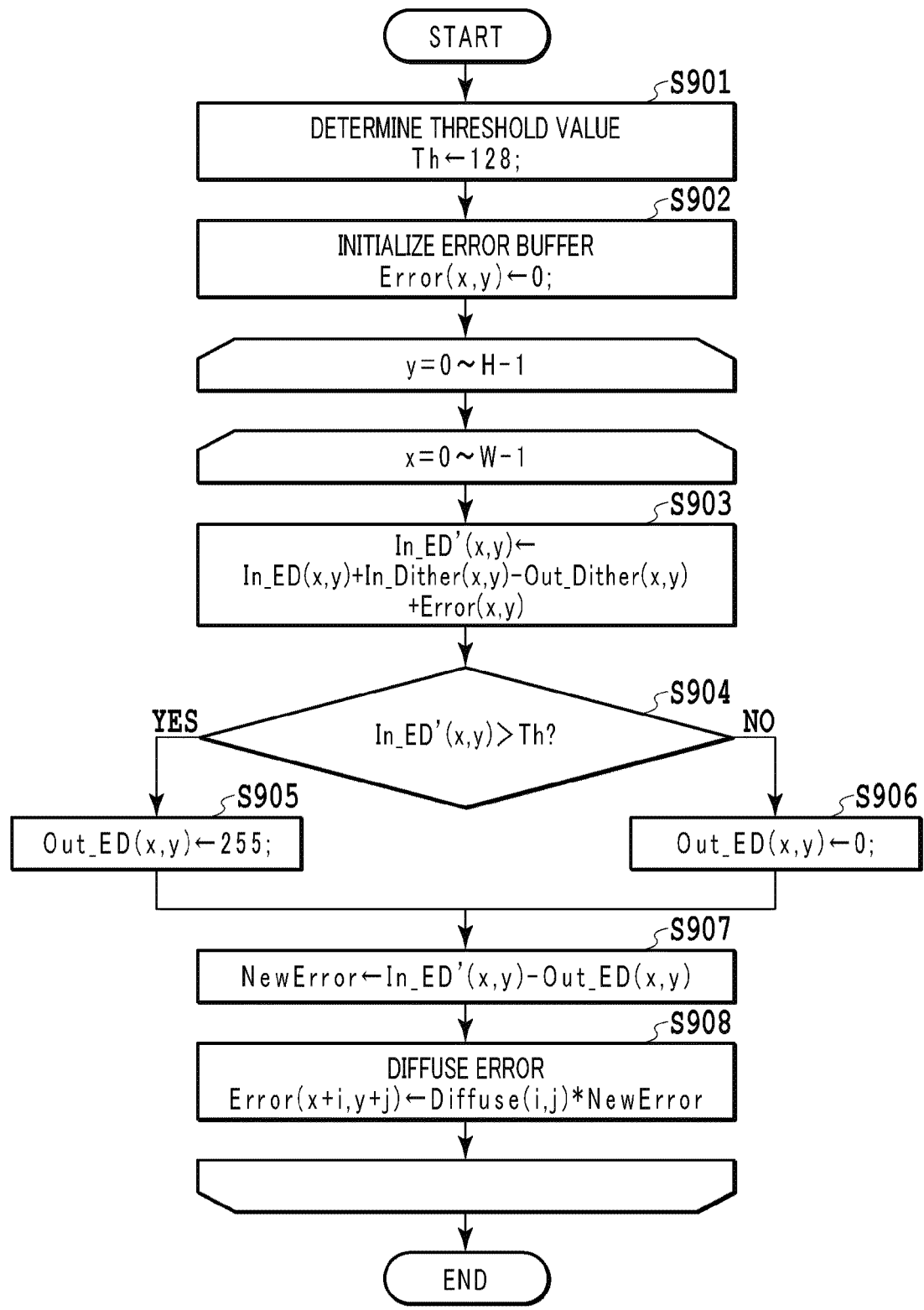
FIG. 9 is a flowchart showing details of error diffusion processing in the first embodiment.

At step 603, the second halftone unit 503 performs the error diffusion processing on the error diffusion density In_ED set at step 601 and determines a dot pattern of the fourth path. In this error diffusion processing, the results Out_Dither of the dither processing obtained at step 602 are used. FIG. 9 is a flowchart showing details of the error diffusion processing in the present embodiment.

At step 901, the second halftone unit 503 determines a threshold value Th that is used at step 904, to be described later. In the present embodiment, Th is set to 128 (Th=128).

At step 902, the second halftone unit 503 initializes an error buffer (Error). In the present embodiment, all the pixels in the error buffer are initialized to 0. For convenience of explanation, it is assumed that the size of the error buffer is the same as the size of the input image (the error buffer has the same width and the same height as those of the input image). Further, it is also assumed that the error diffusion processing according to the present embodiment is performed by scanning the row one by one from left to right, and that the pixel of interest is (x, y).

At step 903, the second halftone unit 503 sets a processing target density In_ED' (x, y). Specifically, what is obtained by adding the difference In_Dither (x, y)−Out_Dither (x, y) due to the dither method and further adding the diffused error to the error diffusion density In_ED (x, y) in the pixel of interest (x, y) is newly taken to be In_ED' (x, Y).

At step 904, the second halftone unit 503 compares the processing target density In_ED' (x, y) with the threshold value Th. In the case where the processing target density In_ED' (x, y) is greater than the threshold value Th, the processing proceeds to step 905. On the other hand, in the case where the processing target density In_ED' (x, y) is equal to or less than the threshold value Th, the processing proceeds to step 906.

At step 905, the second halftone unit 503 sets the output value Out_ED (x, y) of the final path by the error diffusion processing to 255 (ON dot).

At step 906, the second halftone unit 503 sets the output value Out_ED (x, y) of the final path by the error diffusion processing to 0 (OFF dot).

At step 907, the second halftone unit 503 finds an error NewError that has occurred in the pixel of interest (x, y) based on the processing target density In_ED' (x, y), which is the input value, and the output value Out_ED (x, y). Specifically, the difference between the input value In_ED' (x, y) and the output value Out_ED (x, y) is determined to be the error NewError that has occurred in the pixel of interest (x, Y).

Figure 10:
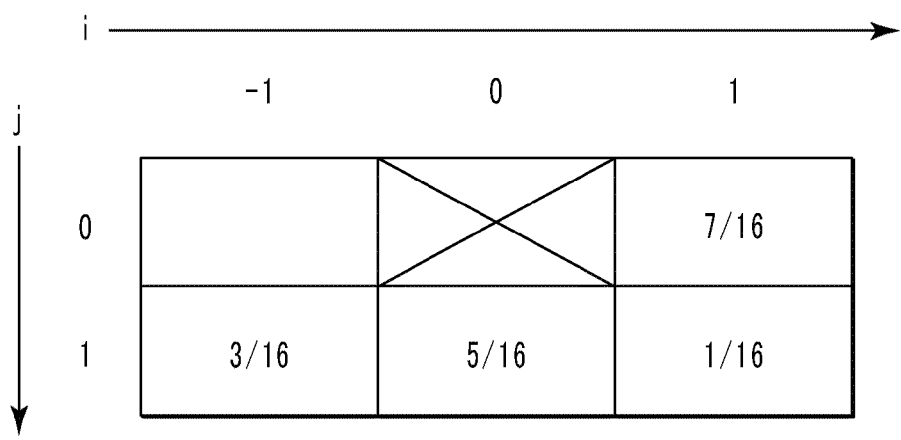
FIG. 10 is a diagram showing examples of diffusion coefficients.

At step 908, the second halftone unit 503 diffuses the error to the pixels around the pixel of interest (x, y) by multiplying the error NewError that has been found by a predetermined diffusion coefficient Diffuse (i, j) in accordance with the position relationship of the pixel of interest (x, y). FIG. 10 is a diagram showing an example of the diffusion coefficient. The diffusion coefficient shown in FIG. 10 is generally called the Floyd-Steinberg error diffusion coefficient. The pixel of interest (x, y) is taken to be the pixel attached with a cross mark in FIG. 10 and the coordinate on the left and right sides thereof is indicated by i (positive on the right side) and the coordinate on the upper and lower sides thereof is indicated by j (positive on the lower side). The coefficients allocated to the pixels adjacent to the pixel of interest, such as 7/16, 3/16, 5/16, and 1/16, are used as weights, and the error NewError that has occurred in the pixel of interest (x, y) is diffused to the adjacent pixels. Pixels whose error diffusion destination is out of the image may be ignored.

By performing the processing such as this on all the pixels within the image, it is possible to obtain the data Out_ED (x, y) indicative of the dot arrangement of the fourth path. In the present embodiment, the path to which the error diffusion processing is applied is limited only to the fourth path, which is the final path, and therefore, Out_ED (x, y) will be the dot pattern as it is as the error diffusion processing results. In the case where there exists a plurality of paths to which the error diffusion processing is applied, processing to allocate the obtained data Out_ED (x, y) of the dot arrangement to an arbitrary number of paths will be incorporated as a result. The case where there exists a plurality of paths to which the error diffusion processing is applied will be explained in a fifth embodiment.

The above is the contents of the halftone processing according to the present embodiment.

By the processing as described above, it is possible to determine a dot pattern that should be printed by each path while changing the contents of the halftone processing that is applied in accordance with the path. Then, by performing the halftone processing such as this, it is possible to obtain the following effects.

(Effects by the Present Embodiment)

In the multipath system, a higher degree of dispersiveness of dots in each path is more desirable as already described and there can be considered a method based on the dither processing and the error diffusion processing, respectively, as a method of performing halftone processing while maintaining a high degree of dispersiveness of each path. Generally, the dither processing is known as a method that is fast but disadvantageous in terms of image quality, such as granularity and frequency responsiveness. On the other hand, it can be said that the error diffusion processing is slow compared to the dither processing but is a method advantageous in terms of image quality. The reason will be explained as follows.

As described above, in the dither processing, the output value is determined by a comparison between the threshold value matrix in which threshold values are stored in the form of an array and the input value. Here, the output value of each pixel is not affected by the output results of the adjacent pixels. In other words, it is easy to implement parallelization of the processing and this point contributes to high-speed processing. On the other hand, this feature frequently acts disadvantageously to granularity and frequency responsiveness in an image. In the dither processing, the output value is determined by a comparison between the threshold value and the input value, and therefore, a dot that is used to represent a light gradation is also used without fail to represent a gradation darker than the light gradation. Regardless of the fact that the distance between dots of a dot pattern having favorable dispersiveness in accordance with a tone level is originally different from that of another dot pattern, it is necessary to represent a dot pattern of another tone level while holding a dot pattern for representing a light tone level, and therefore, it is difficult to implement an arrangement of dots with a high degree of dispersiveness. Consequently, the dither processing is disadvantage in terms of granularity. Further, as a result of that "the output value is not affected by the output results of the adjacent pixels" described previously, there is a case where the sense of resolution as an image is reduced. For example, a high-frequency input image in which the shades change alternately for each pixel is assumed. In the case where the threshold value matrix is applied to this image, on a condition that a large threshold value is used accidentally for a pixel whose input value is large and the output value is determined to be white, the sense of resolution of the pixel will be lost. In this manner, the dither processing is disadvantageous in terms of frequency responsiveness. On the whole, it can be said that the dither processing is high-speed processing because a predetermined dot pattern is applied, but has a problem of image quality accordingly.

On the other hand, the error diffusion processing is sequential processing in which an error produced in a pixel on which processing has already been performed is diffused to the next pixel. It is not possible to determine the output value of the next pixel until the error that is to be diffused is determined, and therefore, the error diffusion processing is not suitable to the parallel processing of each pixel. Further, as in Japanese Patent Laid-Open No. 2009-262455, in the case where the dot arrangement in another path is taken into consideration, it is necessary to sequentially perform processing in order, such as in the order of the first path, the second path, and so on, and therefore, the processing further takes time. However, this feature acts advantageously in terms of granularity and frequency responsiveness. The sequential processing is so-called adaptive processing on an input image and it is possible to arrange dots freely in an adaptive position in accordance with the change in gradation of an input image. Because of this, a favorable dot arrangement with a high degree of dispersiveness, in other words, a dot arrangement with a low degree of granularity is obtained. Further, because a pixel on which processing has already been performed affects adjacent pixels by the diffusion of an error, it is possible to represent a high-frequency shade of an image, and therefore, frequency responsiveness is excellent. On the whole, it can be said that the error diffusion processing is inferior to the dither processing in terms of speed because the error diffusion processing is adaptive processing that is performed sequentially on an input image, but is superior to the dither processing in terms of image quality because of that.

With the features as above in mind, which the dither processing and the error diffusion processing have, respectively, in the present embodiment, dot arrangements are determined by using the dither processing on a plurality of preceding paths and on the final path, a dot arrangement is determined by applying the error diffusion processing. Due to this, while the speed of the halftone processing is increased by making use of the simplicity and parallelization of the processing, which are advantages of the dither processing, improvement in image quality is also aimed at by performing the error diffusion processing on the final path by taking into consideration the dot arrangements by the dither method. By performing the error diffusion processing on the image in which the dot arrangements have been determined by the dither method as to part of the density, a dot arrangement close to the results in the case where only the error diffusion processing is applied is obtained, and therefore, the granularity of the final dot pattern is improved. As explained above, by adopting the configuration of the present embodiment in which the method of halftone processing is changed in accordance with a path, it is made possible to cause the dot dispersiveness in each printing and the image quality in image formation to coexist with each other while preventing an increase in processing burden and keeping high speed.

Further, as to the dispersiveness of each path and the granularity of the final dot pattern, it is necessary to note that the final dot pattern should be regarded as more important in a highlight area where the density is low. The reason is that in the highlight area, the number of black dots that are ejected is originally small, and therefore, the degree of dispersiveness of each path tends to increase spontaneously. The present embodiment premises that both the dither processing and the error diffusion processing are used by associating the processing density with the path and the error diffusion processing superior in terms of image quality is allocated to the density range of lower densities of the input density and the dither processing is allocated to the density range of higher densities. Consequently, in the highlight area whose density value is small, only the error diffusion processing density In_ED is set as a result. Due to this, it is possible to obtain an image of a higher image quality by increasing the influence of the error diffusion processing excellent in granularity in the highlight area.

However, it is known that a problem, such as sweeping, occurs in the error diffusion processing in the ultra highlight area (e.g., an area including pixels whose value of the input node In is "10"). Because of this, it may also be possible to the halftone processing so that only the dither processing is performed for the ultra highlight area in order to avoid this problem. There is a case where it is desirable to set the density so that the halftone processing with the same contents is applied to all the paths depending on the input density as described above.

In the present specification, in order to simplify explanation, those which are not essential are omitted. For example, it is known that the phenomenon called texture or worm in which the arrangement of dots forms an eyesore pattern and the phenomenon called sweeping in which a delay in generation of dots occurs in the low density/high density portions may occur in the error diffusion processing. It may also be possible to further apply the publicly-known technique in order to deal with such problems in image quality. For example, it may also possible to simultaneously perform processing, such as processing to adaptively change the error diffusion coefficients, to cause the value of the error buffer to have a certain value instead of clearing the value to 0, to dynamically change the threshold value or to add noise, and to alternately scan pixels left to right and right to left.

Modified Example

As a modified example, it may also be possible to perform the dither processing on the density that is equal to or lower than the input density In and whose degree of dot dispersiveness in dither is high, and to perform the error diffusion processing on the density that is a difference between the input density In and the dither density In_Dither. For example, among 1, 2, 4, 8, 16, 32, 64, and 128, the density that is equal to or lower than the input density In and which is close to the input density In is taken to be the dither density In_Dither (x, y) and on the remaining densities, the error diffusion processing is performed. At this time, the input density In (x, y) is given as the error diffusion density In_ED (x, y) and in the pixel in which Out_Dither (x, y)=255, Out_ED (x, y) is set to 0. For calculation of a quantization error, expression (4) below is used.

$$In(x,y) - Out\_Dither(x,y) - Out\_ED(x,y) \quad \text{expression (4)}$$

However, the values of Out_Dither (x, y) and Out_ED (x, y) do not take "255" at the same time, and therefore, it may also be possible to use In (x, y)−Out_ED (x, y) in the case where Out_Dither (x, y)=0, and In (x, y)−Out_Dither (x, y) in the case where Out_Dither (x, y)=255, respectively, as a quantization error. In the case of the densities having values of powers of 2 as described above, it is possible to generate a dot pattern with a high degree of dot dispersiveness even on a condition that dots are added to a dot pattern on the low density side. Consequently, in this case, it may also be possible to generate Out_Dither (x, y) by referring to the dot pattern of each density (1, 2, 4, 8, 16, 32, 64, 128) from the coordinates (x, y).

Second Embodiment

In the first embodiment, the first halftone unit 503 determines the dot patterns of the first to third paths by the dither processing and the second halftone unit 504 determines the dot pattern of the fourth path by the error diffusion processing. However, it may also be possible to provide a halftone unit for each path in a one-to-one manner, such as that the first halftone unit is provided for the first path, the second halftone unit for the second path, . . . , and the pth halftone unit for the pth path. In terms of the first embodiment, it may also be possible to design the configuration so that the dither processing is performed by the first to third halftone units and the error diffusion processing is performed by the fourth halftone unit. In this case, in each of the first to third halftone units, the dither processing is performed by using C_Up and C_Low different from those in another halftone unit as a result.

Third Embodiment

Figure 11:
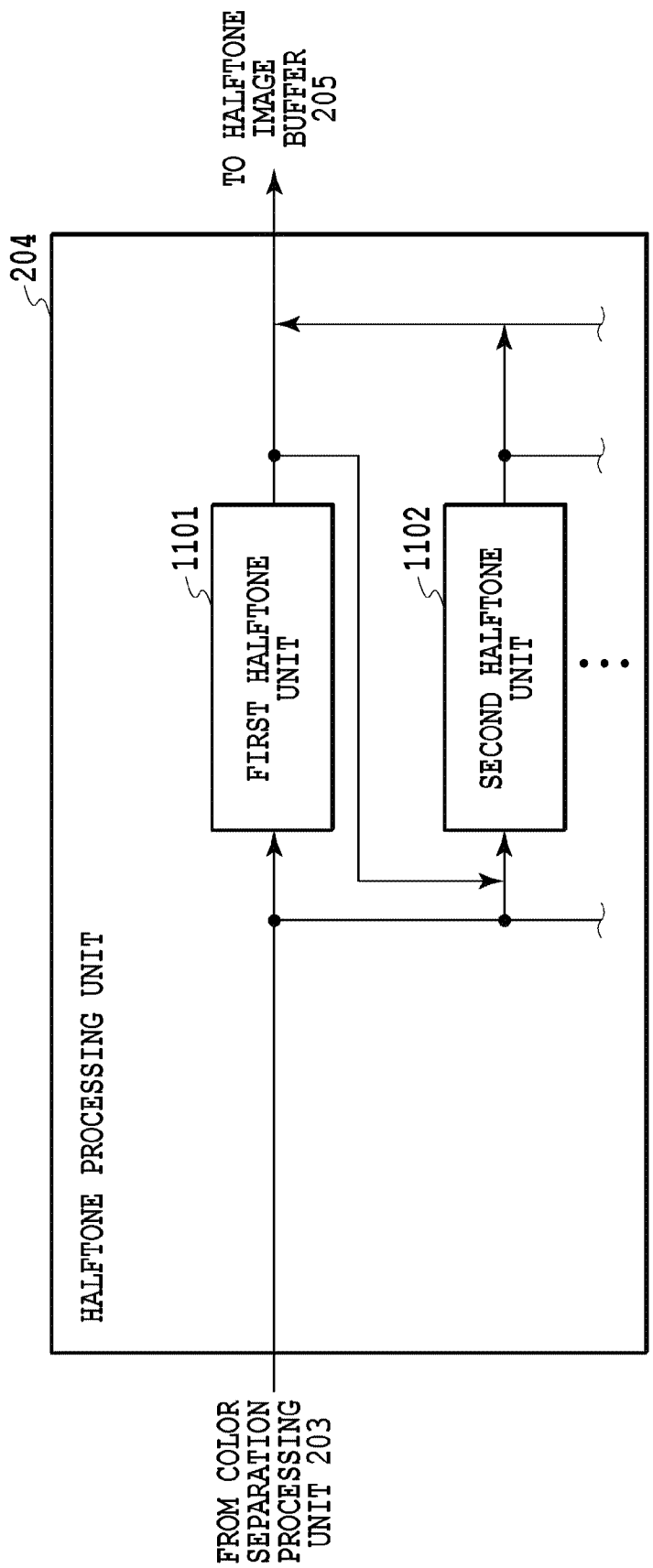
FIG. 11 is a block diagram showing an internal configuration of a halftone processing unit according to a third embodiment.

In the first embodiment, the density range on which each halftone unit performs processing is set by the independent density setting unit. As a result of this, before the first halftone processing unit and the second halftone processing unit perform processing, the image data after color separation processing is divided into at least two pieces of image data. However, the density setting unit does not necessarily need to have an independent configuration. FIG. 11 is a block diagram showing an internal configuration of the halftone processing unit 204 according to the present embodiment in an aspect in which the density setting unit is not used and the configuration includes only a plurality of halftone units (1101, 1102, . . . ). In this case, all of the halftone units constituting the halftone processing unit 204 receive the input density In and the density on which each halftone unit performs processing may be determined by using, for example, threshold values, such as C_Low and C_Up, that are determined by a predetermined calculation explained in the first embodiment. In this case, it is no longer possible to dynamically determine the processing density, which will be described later, but the essence of the present invention in which halftone processing is switched to another in accordance with the path is not lost.

Fourth Embodiment

In the first embodiment, it is determined in advance that the first halftone unit 502 performs processing on the first to third paths and the second halftone unit 503 performs processing on the fourth path. However, it is not necessary to limit the relationship between the halftone units and the paths to that of the first embodiment. FIG. 12A is a block diagram showing the internal configuration of the halftone processing unit 204 according to the present embodiment and the configuration includes a density setting unit 1201, a path setting unit 1204, a first halftone unit 1202, and a second halftone unit 1203.

The path setting unit 1204 determines which halftone unit (i.e., which path) the density set by the density setting unit 1201 is allocated to. As described in the first embodiment, the path setting unit 1204 may allocate all the paths to one of the halftone unit for error diffusion and the halftone unit for dither depending on the gradation of the input density In. Further, it may also be possible not to allocate the density to a certain path, and in this case, the number of paths that are used changes substantially.

Further, as shown in FIG. 12B, it may also be possible to arrange the path setting unit 1204 in the post stage of the first and second halftone units 1202/1203 and to set which path the dot pattern is allocated to after the dot pattern is determined by the halftone processing. For example, it may also be possible to allocate each path in the order of the completion of the halftone processing, for example, in such an order from the first path, the second path, and so on.

Besides the above, as a method of allocating the paths, which is different from that of the first embodiment, the following method can be considered. In the multipath system, preferably, more densities are printed in the middle paths (e.g., in the case of four paths, in the second path and the third path). The reason is that the paths near the first and last paths are likely to use the distal end part of the print head, and therefore, are easily affected by the air flow caused by the movement of the print head and the position to which ink sticks is easily disturbed. Because of this, the densities as many as possible are allocated to the middle paths. In the case of the first embodiment, as MAX_IN_ED, the density value of "64", which is the maximum, is set as the error diffusion density and this means that these density values occupy 25 to 100% of the density values 0 to 255. Because of this, by arranging the error diffusion to the middle paths, it is possible to obtain the merit that many densities are printed in the middle paths. For example, in the case where the path for the error diffusion is determined to be the third path, the dot patterns of the first path and the second path are the same as those of the first embodiment, and the third path in the first embodiment is allocated to the fourth path and the fourth path in the first embodiment is allocated to the third path.

It may also be possible to increase the number of densities that are printed in the path nearer to the path located in the middle in the dither processing. In the first embodiment, the density that is allocated to each path of dither is determined by the two coefficients C_Up and C_Low expressed by the expression (3) and the value of C_Up−C_Low in each path is 1/n and fixed. By setting C_Up−C_Low in each path so that the value of C_Up−C_Low becomes greater in the path nearer to the path located in the middle, it is possible to set more densities to the middle paths.

With these methods in mind, it may also be possible for the path setting unit 1204 to determine which density is allocated to which path in accordance with the density that is printed in each path, for example, in such a manner that the paths whose density is higher are allocated to the middle paths.

Fifth Embodiment

In the first embodiment, the processing by the dither method is performed on the first to third paths and the processing by the error diffusion method is performed only on the fourth path, which is the final path. In order to keep high-speed processing, a smaller number of error diffusion methods that are applied is more desirable. However, depending on the total number of paths and the density range on which the processing is performed by the error diffusion method, it is not necessary to limit the path to which the error diffusion method is applied to the final one path. The case where the error diffusion method is applied to the halftone processing for a plurality of paths (in the case where α≥2 in the first embodiment) is explained as a fifth embodiment.

Figure 13:
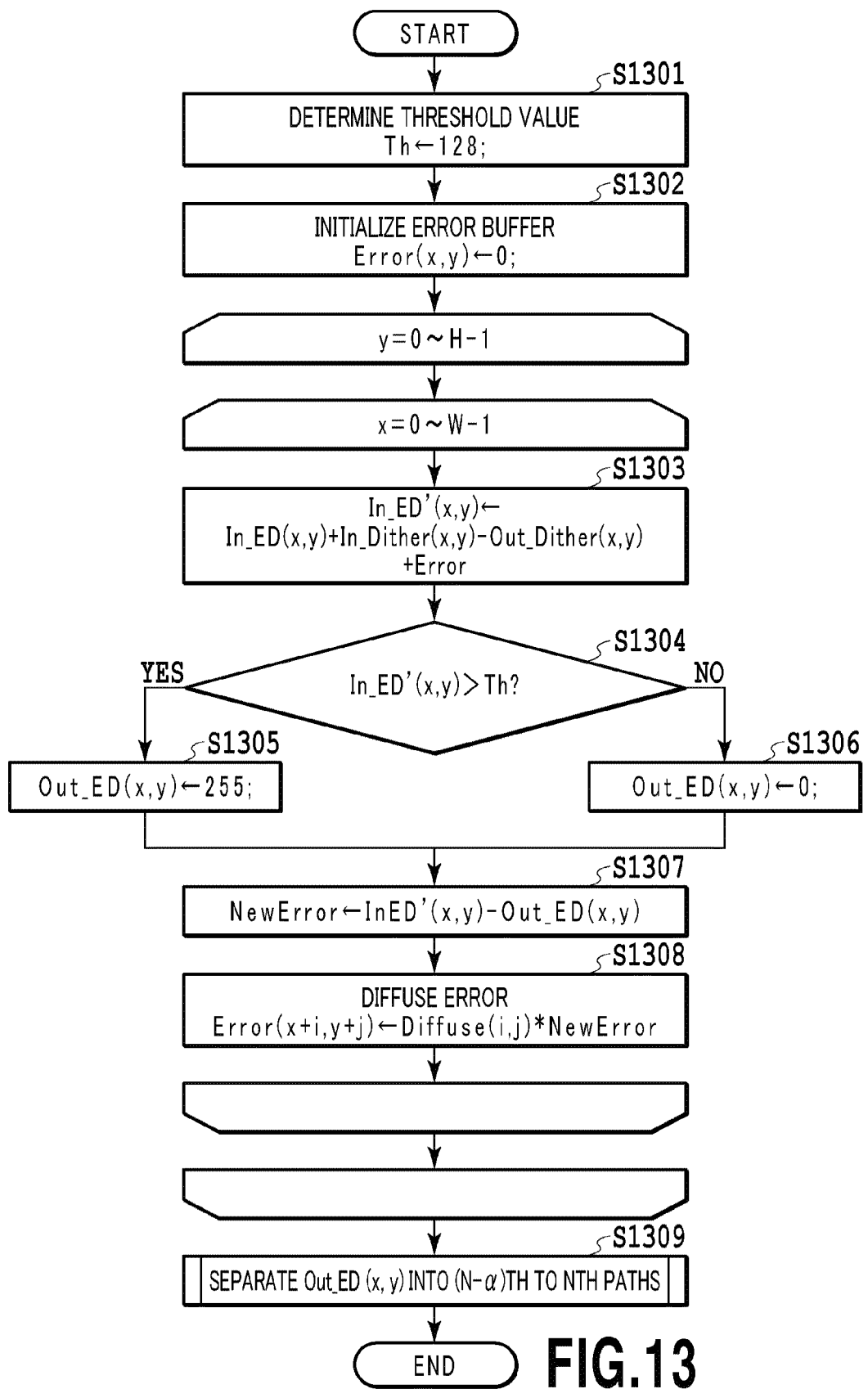
FIG. 13 is a flowchart showing details of error diffusion processing according to a fifth embodiment.

FIG. 13 is a flowchart showing details of the error diffusion processing according to the present embodiment. Step 1301 to step 1308 of all of the steps correspond to step 901 to step 908 of the flowchart in FIG. 9 explained in the first embodiment. In the following, step 1309 that characterizes the present embodiment is explained mainly. Here, it is assumed that the configuration of the image processing unit 204 has the same configuration shown in FIG. 5 in the first embodiment.

In the case where the data Out_ED (x, y) indicative of a dot arrangement is obtained at step 1308, the second halftone unit 503 performs processing to separate the data into an arbitrary number of paths at step 1309. Here, the case is considered where the dot pattern determined by the error diffusion processing is divided into two paths, i.e., an Ath path and a Bth path (α=2). In order to divide the dot pattern, for example, the threshold value matrix as shown in FIG. 8 described previously is used. Specifically, each pixel of the obtained dot arrangement data Out_ED (x, y) is made to correspond to each cell of the threshold value matrix and in the case where the stored threshold value is one of 0 to 7, the pixel is allocated as a pixel that is printed in the Ath path and in the case where the threshold value is one of 8 to 15, the pixel is allocated as a pixel that is printed in the Bth path. In other words, the values of the threshold value matrix are divided into, for example, "2" groups in accordance with the number of divisions of the path and each path is made to correspond to one of the groups. This method is called the path mask or the path separation. It may also be possible to prepare a threshold value matrix different from the threshold value matrix that is used in the dither processing as the threshold value matrix used here. In the case where the number α of paths into which the path is divided changes, it is sufficient to change the relationship between the threshold values in the threshold value matrix and the paths that are allocated. It may also be possible to allocate paths by using a matrix (path mask) etc. in which relevant paths are stored in advance. Further, it may also be possible to allocate the paths based on the results of performing the arithmetic operation on the pixel of interest (x, y), for example, in such a manner that the value of x+y is found from the pixel of interest (x, y) and in the case where the value is odd, the Ath path is allocated and in the case where the value is even, the Bth path is allocated. Alternatively, by a method in which each time a dot is generated by the error diffusion processing, the Ath path and the Bth path are allocated alternately to the dot, it is also possible to separate dots into each path.

By the processing as above, it is made possible to perform the present invention without the need to limit the number of paths to which the error diffusion method is applied to one. It is also possible to use the above-described methods similarly in the case where a dot pattern determined by the dither processing is further divided into a plurality of paths.

Further, it may also be possible to determine each dot pattern in a plurality of paths by sequentially performing the error diffusion processing in the order of paths, in place of the above-described path mask method etc. Here, the case is considered again where α is set to 2 (α=2) and the dot arrangement data Out_ED (x, y) obtained at step 1308 is divided into the two paths: the Ath path and the Bth path. First, from the density for the error diffusion processing, the density for the Ath path and the density for the Bth path (e.g., each is the density of In_ED/2) are set. Then, the error diffusion processing is performed on the density for the Ath path by the same method as that in the first embodiment and the dot pattern of the Ath path is determined first. Next, the error diffusion processing is also performed on the density for the Bth path by the same method. At this time, the dot pattern determined in the Ath path is referred to and in the Bth path, the dot arrangement is determined so that dots are more unlikely to be arranged in the pixels around the pixel in which a dot is placed in the Ath path. In this manner, it is possible to make higher the degree of dot dispersiveness of the Ath path and the Bth path.

By using the method as above, it is possible to separate the error diffusion processing to be performed once or a few times into dot patterns of a plurality of paths. As described above, by using both the method and the dither processing, it is possible to reduce the processing load and to improve image quality. Further, by using this method, it is also possible to prevent extreme unevenness in the density in each path. This is explained.

In the first embodiment, there exists a path that does not perform printing depending on the density. For example, in the range in which the input density is equal to or less than MAX_IN_ED=64, the error diffusion processing is performed on all the densities, and therefore, only in the fourth path, printing of dots is performed. Further, even in the case where the input density is higher than 64, there is a possibility that a great difference between the density that is printed in the fourth path and the density that is printed in the other paths will be produced. In view of the burden of the printing element, desirably, there is no unevenness in the density that is printed in each path. By changing the method of allocating the density to each path for each pixel, it is possible to make more uniform the density that is printed by each path.

Figure 18:
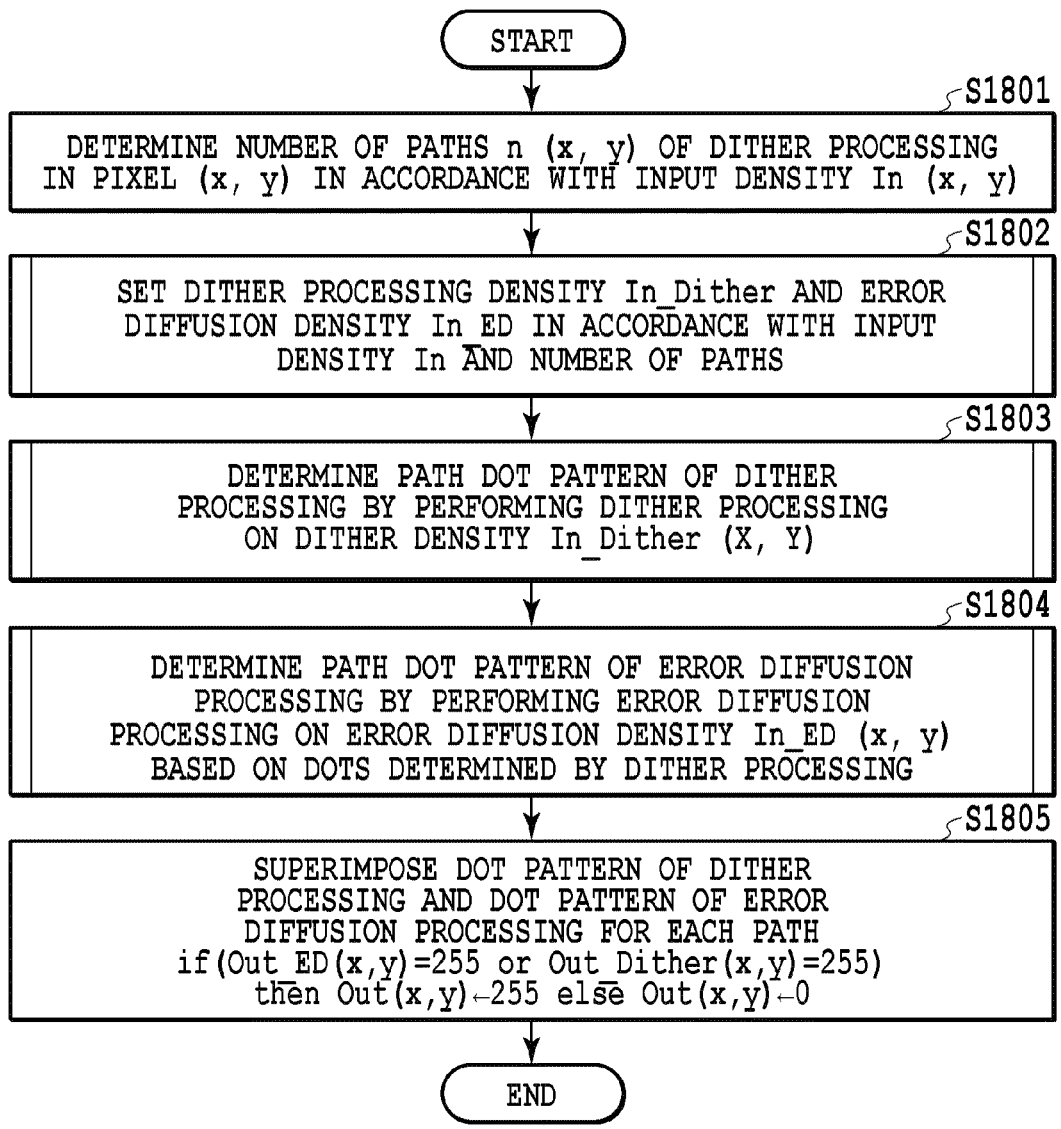
FIG. 18 is a flowchart in the case where the allocation of the path is changed for each pixel according to the fifth embodiment.

In the present embodiment, the method of allocating each path to the halftone is changed for each pixel. FIG. 18 is a flowchart showing a flow of the processing in the case where the allocation of paths is changed for each pixel according to the present embodiment. Explanation of the portions in common to those in the previous embodiments is omitted.

First, in accordance with the input density In, the numbers of paths by the error diffusion processing and the dither processing are determined for each pixel (step 1801). Here, it is assumed that the total number of paths=4, the number of paths by the dither processing is n, and the number of paths by the error diffusion processing is α=N−n. In the case where the densities are allocated equally to each path in each halftone processing method, the number of densities per path of the dither processing is In_Dither/n and that of the error diffusion processing is In_ED/α. In the case where the number n of paths of the dither processing is selected so that the density difference is as small as possible in the range where the density is higher than MAX_IN_ED=64, the results will be as follows.

In the case where 0≤In≤64, n=0, α=4
In the case where 65≤In≤99, n=1, α=3
In the case where 100≤In≤179, n=2, α=2
In the case where 180≤In≤255, n=3, α=1

At this time, the number of paths by the dither processing, which is different depending on the density value of each pixel (x, y), is described as n (x, y). Once the number of paths is determined, as in the first embodiment, In_Dither and IN_ED are determined in accordance with the expression (1) (step 1802).

As to the density In_Dither on which the dither processing is performed, two coefficients for the allocation of paths are found by expression (5) using n (x, y) below and then the density is separated into dot patterns of respective paths (step 1803).

$$C\_Low = (p-1)/n(x,y)$$

$$C\_Up = p/n(x,y) \qquad \text{expression (5)}$$

In the error diffusion processing at step 1804 that follows, by dividing the number of threshold values stored as described above into a (x, y) groups by using a threshold value matrix different from the threshold value matrix used in the dither processing and by making a dot correspond to a path, a generated dot is allocated to one of the α (x, y) paths.

Finally, at step 1805, by superimposing the dot pattern generated by the dither processing and the dot pattern generated by the error diffusion processing in each path, the dot pattern that is to be printed is obtained. Specifically, in the case where a dot is generated by either processing, the dot is printed in the pixel position in that path.

By the method in the present embodiment, the results of the error diffusion processing are used to determine the dot pattern of each path, and therefore, it is not possible to precedently perform printing of the specific path of only the dither processing as in the first embodiment. However, it is possible to obtain a dot pattern excellent in granularity by raising a degree of dot dispersiveness of each path in the high-density part while performing the error diffusion processing only once and by using the error diffusion method in the low-density part. Further, it is possible to prevent extreme unevenness in the density that is printed in each path by flexibly setting the printing density of each path.

Sixth Embodiment

In the above embodiments, basically the dot pattern is determined by applying the dither processing and the dot pattern is determined by applying the error diffusion processing based on the determined dot pattern. However, it may also be possible for each halftone unit to perform halftone processing without receiving feedback from another halftone unit.

Figure 14:
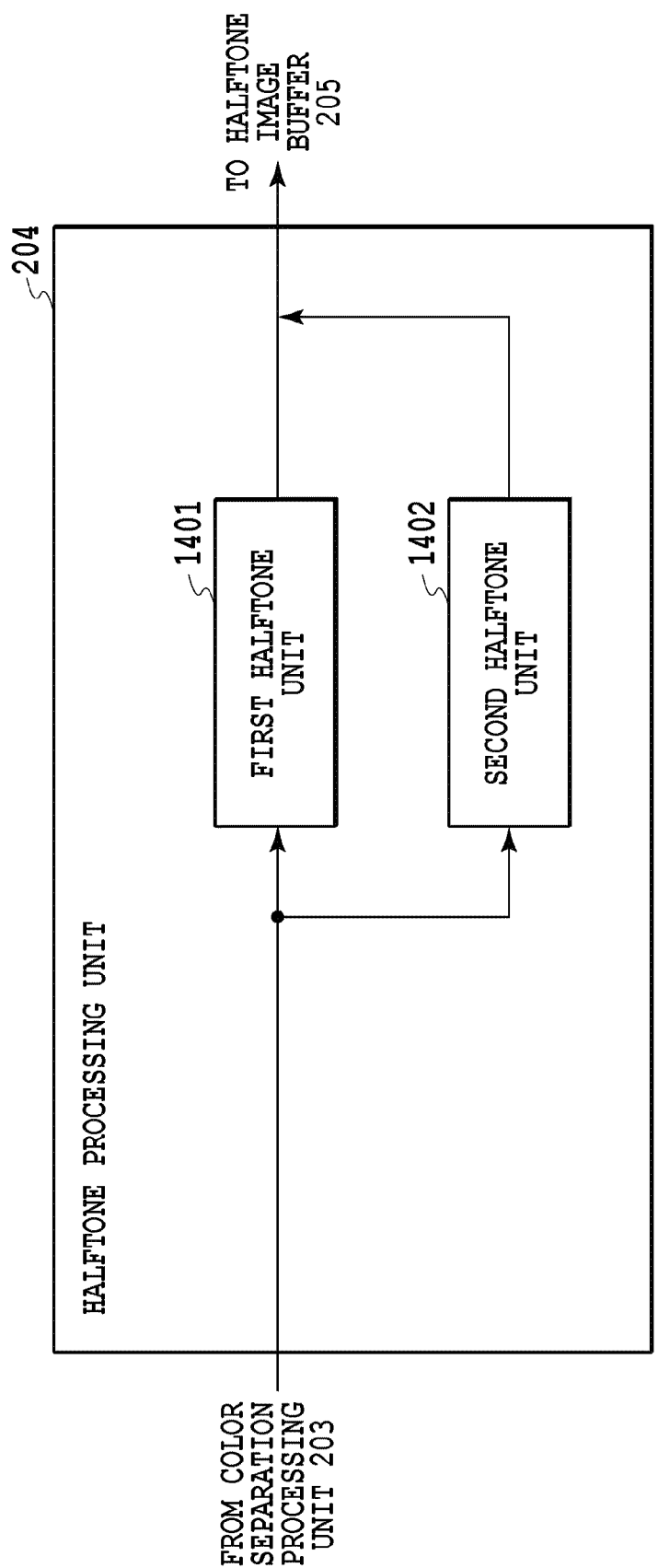
FIG. 14 is a block diagram showing an internal configuration of a halftone processing unit according to a sixth embodiment.

FIG. 14 is a block diagram showing an internal configuration of the halftone processing unit 204 according to the present embodiment, and the halftone processing unit 204 includes a first halftone unit 1401 and a second halftone unit 1402. The first halftone unit 1401 and the second halftone unit 1402 perform halftone processing by using different methods. As is obvious from FIG. 14, the output of the first halftone unit 1401 is not input to the second halftone unit 1402, and therefore, feedback is not given.

It is considered generally that the image quality is better by the method in which the error diffusion processing is performed based on the dot pattern determined by the preceding path as explained in the foregoing embodiments, but it is possible to give priority to high-speed performance by performing processing without waiting for feedback of the preceding path. In the configuration in which feedback is not given as shown in FIG. 14, the density setting unit and the path setting unit may be provided as in the other embodiments.

Seventh Embodiment

Next, a variation of the halftone processing method (dither method) that is performed on the preceding path is explained. For example, there can be considered a method in which dots are superimposed as described below.

In the flowchart in FIG. 7 explained in the first embodiment, C_Low and C_Up, which are the coefficients to separate the output results to each path, are determined at step 701. By the coefficients, the results of performing the dither processing on the dither density In_Dither, which are divided to each of the first to nth paths, are obtained. In other words, by the method of the first embodiment, in the dot pattern of each of the first to nth paths for which the dot pattern is determined by the dither processing, dots are exclusive from those in another dot pattern. The reason is that the range of the input value that does not overlap another range is allocated to each path by using the coefficients that are derived from the expression (3). In the case where dot patterns in which dots are exclusive from each other between paths are printed, it is known that the density easily varies due to the deviation in the ink position. In the seventh embodiment, a method of outputting dot patterns so that part of dots overlap other dots in another dot pattern (dot exists in the same position) in each of the first to nth paths for which the dot pattern is determined by the dither processing is explained. In the method of the present embodiment, dots in the same positions of part of dots in the dot pattern printed by the first path printing are added to the dot patterns that are printed in the second and subsequent paths. Because of this, here, new coefficients C_Low2 and C_Up2 for the dither processing of the second and subsequent paths are defined. These two new coefficients are found by expression (6) below.

$$C\_Low2 = C^*(p-2)/n$$

$$C\_Up2 = C^*(p-1)/n \hspace{2cm} \text{expression (6)}$$

In the above-described expression (6), C is a constant smaller than 1 and p≥2. The same processing that is performed on C_Low and C_Up at step 702 to step 708 is performed on these coefficients C_Low2 and C_Up2 at the same time as the processing that is performed on C_Low and C_Up and thus the arrangement of dots is determined. At this time, the output dot is the logical OR of the presence/absence of the dot that is determined from C_Up and C_Low and the presence/absence of the dot that is determined from C_Low2 and C_Up2 (in the case where it is determined that a dot is output based on one of them, the dot is output). Specifically, explanation is given by using numerical values in the case where n=3. C_Low and C_Up of the first path are 0 and ⅓, respectively, C_Low and C_Up of the second path are ⅓ and ⅔, respectively, and C_Low and C_Up of the third path are ⅔ and 1, respectively. This means that the range from 0 to ⅓ of the range of the input value is allocated to the first path, the range from ⅓ to ⅔ to the second path, and the range from ⅔ to 1 to the third path. As the results of the processing at step 702 to step 708, in the respective dot patterns of the first to third paths, dots corresponding to ⅓ of the range of the input value are arranged and dots have an exclusive relationship with dots in the other dot patterns.

In addition to the above, in the dither processing of the second and subsequent paths, dots in the range of C_Low2 and C_Up2 are also printed. In the case where it is assumed that C=0.1, each coefficient that is calculated in accordance with the expression (6) is C_Low=0 and C_Up=1/30 in the second path, and C_Low=1/30 and C_Up=2/30 in the third path. In other words, in the second path, in addition to the above-described dot pattern, dots corresponding to the density that is obtained by multiplying the input value by 0 to 1/30 are added. The range of 0 to 1/30 of the input value that is added to the printing of the second path overlaps the range of the input value allocated to the first path. Consequently, the dots that are added to the second path are the dots in the same positions as part of dots included in the dot pattern printed in the first path, and therefore, those dots are overlapped dots. This is also true with the third path and dots corresponding to the range determined by C_Low2 and C_Up2 are the dots in the same positions as part of dots included in the dot pattern of the first dot, and therefore, the dots are overlapped dots. The number of dots that overlap is determined by the constant C, and the greater the value of the constant, the more dots overlap, and the smaller the value of the constant, the less dots overlap. With this in mind, an arbitrary value (that can be corrected by an output y) with which the lightness that is printed dose not change is selected.

As described previously, in the case where all the dots are printed in different positions between printing paths, on a condition that dots are printed on a printing medium with a deviation in position, the printing density varies. However, in the case where part of dots of the dot pattern of each path overlap those of another path by the processing such as described above, dots that overlap other dots and dots that do not overlap exist in the intermingled state regardless of the occurrence of a deviation in position, and therefore, there is an effect that variations in the printing density are reduced. This is particularly effective in the area whose density is intermediate or higher.

Further, in place of the dither method, it may also be possible to use the publicly-known halftone technique as an appropriate technique, whose processing burden is comparatively small and in which parallelization of processing is easily implemented, i.e., processing is repeatedly performed in terms of area. For example, it may also be possible to have a plurality of threshold value matrixes and to selectively use the threshold value matrix based on the input value of each pixel and the results of detecting the attributes (edge part/non-edge part etc.) of the image area. Alternatively, it may also be possible to directly determine an output by referring to a database or a table recording the present/absence of a dot from the pixel position and the pixel value, not by comparing the pixel value with the threshold value. Furthermore, it may also be possible to apply a halftone method in which the density is adjusted by regarding a plurality of pixels as one area without performing one pixel-to-one pixel processing.

Eighth Embodiment

Figure 15:
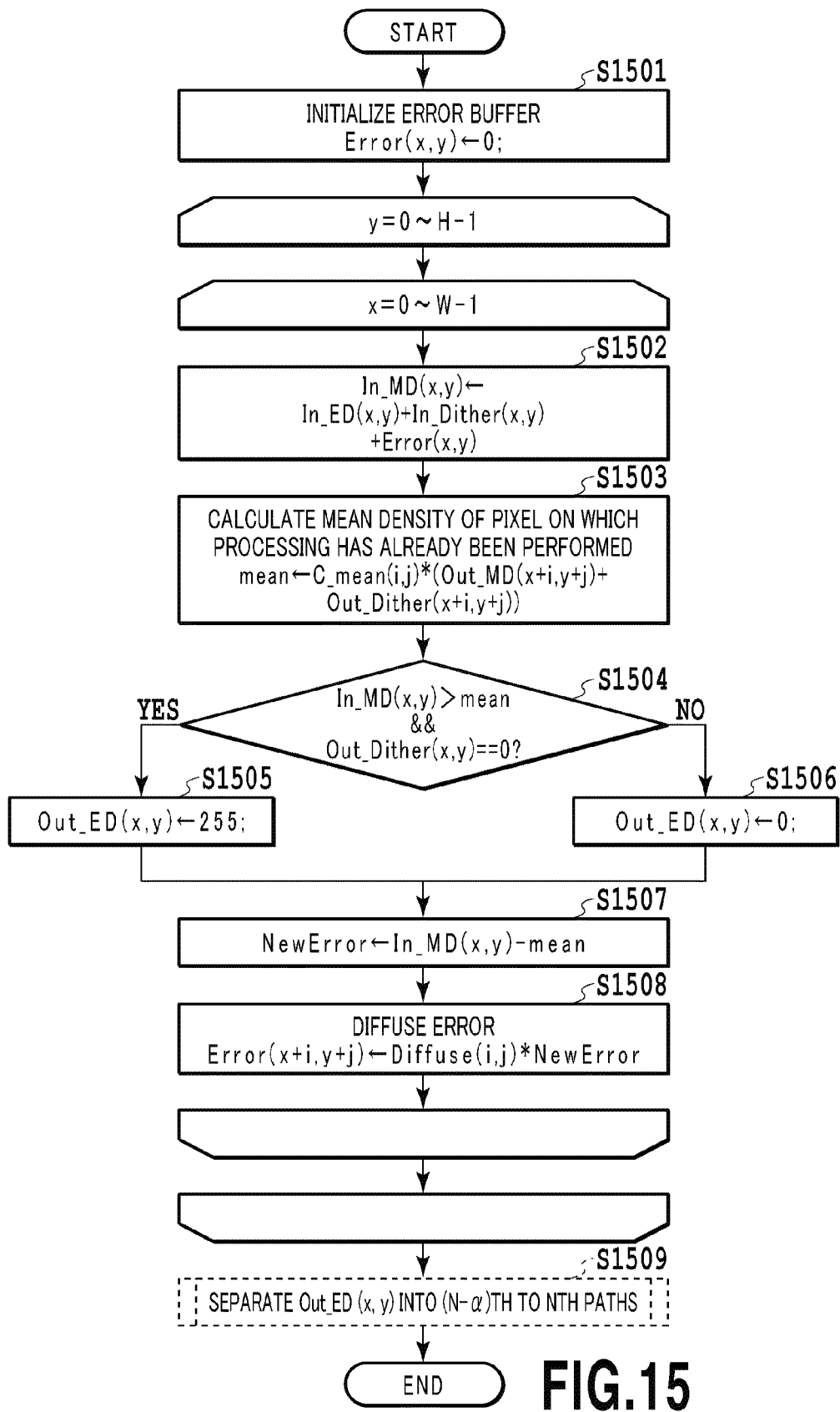
FIG. 15 is a flowchart showing details of mean density approximation processing according to an eighth embodiment.

Next, a variation of the halftone processing method that is performed on the subsequent paths is explained. For example, it is considered to use the mean density approximation method (MD method) that has been disclosed in Japanese Patent Laid-Open No. H02-210960(1990) etc. The mean density approximation processing is a method in which binary pixels on which the error diffusion processing has already been performed are weighted and added, and then the sum is taken to be a mean density mean, and the difference therebetween is diffused as an error. FIG. 15 is a flowchart showing details of the mean density approximation processing. Hereinafter, an outline thereof is explained.

Figure 16:
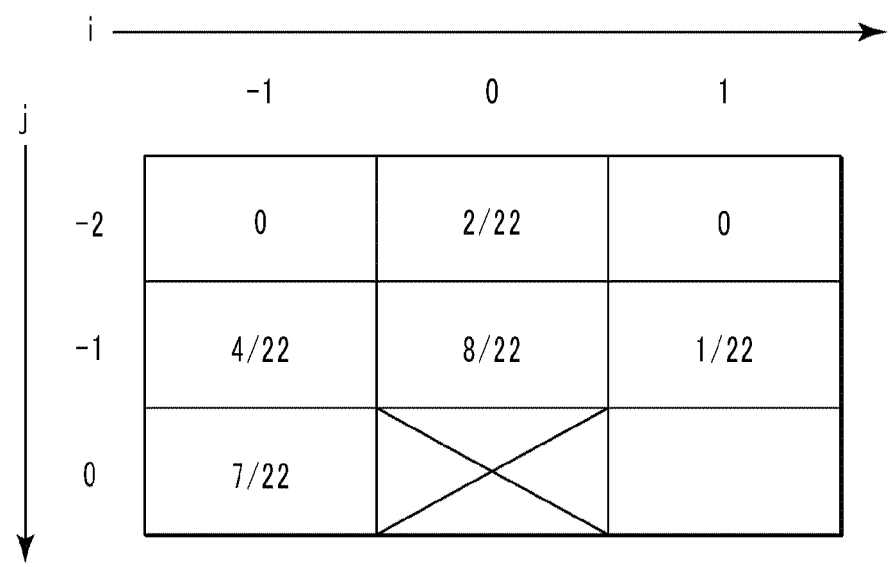
FIG. 16 is a diagram showing examples of weights for pixels on which processing has already been performed.

First, the input value is an input density with an error (step 1502). FIG. 16 is a diagram showing an example of weights for the pixel on which the processing has already been performed. The pixel with a x mark is taken to be the pixel of interest, and the values (binary, 0 or 255) of the pixels on which the processing has already been performed are multiplied by the weights listed in FIG. 16 as coefficients and then added, and the sum of the addition is taken to be the mean density mean (step 1503).

Then, the binary determination is performed by using the mean density mean as a threshold value in place of the threshold value Th of the error diffusion (step 1504).

Next, a difference between the newly obtained error NewError and the mean density mean is calculated (step 1507).

Next, NewError is diffused to the peripheral pixels (pixels adjacent to the pixel of interest) as in the error diffusion (step 1508). Here, the diffusion coefficient Diffuse to the pixel to the right of the pixel of interest is ½ and that to the pixel below the pixel of interest is ½.

In the case of this method, it is possible to narrow the range of error diffusion. It may also be possible to apply the method such as this in place of the error diffusion method.

Ninth Embodiment

In the above embodiments (except for the sixth embodiment), as the dot arrangement data that is referred to in the error diffusion processing, the dot arrangement data that is determined by the dither processing is used. However, it may also be possible to use data obtained by scanning a dot pattern that has already been formed on a printing medium or the like by the image forming apparatus.

Hereinafter, explanation is given by supposing the case where the halftone processing is performed in the four-path multipath system in such a manner that the dither processing is performed in the first to third paths and the error diffusion processing is performed in the fourth path as explained in the first embodiment.

It is assumed that the dither processing is completed in the first to third paths and the dot patterns of the first to third paths are printed on the printing medium. At this time, on the printing medium, the dot pattern in which the respective dot patterns of the first to third paths are accumulated should be formed. However, due to a physical deviation that occurs in the nozzles of the image forming apparatus, in the control mechanism, and in the printing medium, there is a case where the dot pattern actually formed on the printing medium differs from the accumulated dot pattern that is intended. Because of this, even in the case where the dot pattern of the fourth path is determined based on the dot patterns of the first to third paths that are obtained by the dither processing, there is a possibility that the accumulated dot pattern on the printing medium does not have the intended arrangement, and therefore, an expected image quality is not obtained.

Because of this, the printing medium on which the dot patterns of the first to third paths have been printed actually is scanned and the density of the image formed on the printing medium is acquired, and then, the difference between the acquired density of the image and the density of the original image is set as an error diffusion density on which processing is performed in the final path. Then, the error diffusion processing is performed on the set error diffusion density and the dot pattern of the final path is determined.

Figure 19:
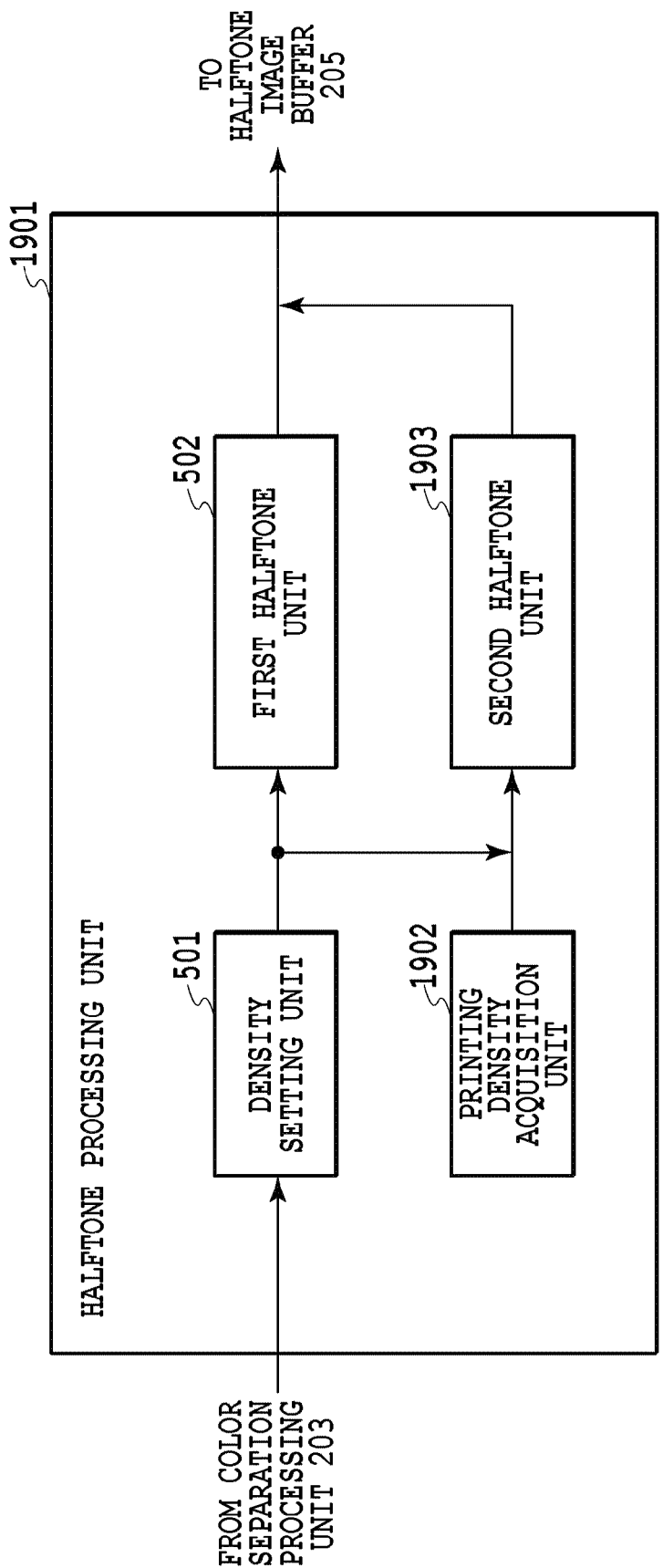
FIG. 19 is a block diagram showing an internal configuration of a halftone processing unit according to a ninth embodiment.

FIG. 19 is a block diagram showing an internal configuration of the halftone processing unit 204 according to the present embodiment. In the case of the present embodiment, a printing density acquisition unit 1902 configured to acquire the density of an image on a printing medium is provided newly and information on the printing density that is obtained by this unit is used. In other words, in the present embodiment, a second halftone unit 1903 determines a dot pattern by performing the error diffusion processing using information on the actual printing density acquired by the printing density acquisition unit 1902, in place of the information on the dot arrangement determined by the first halftone unit 502 (dither processing).

Figure 20:
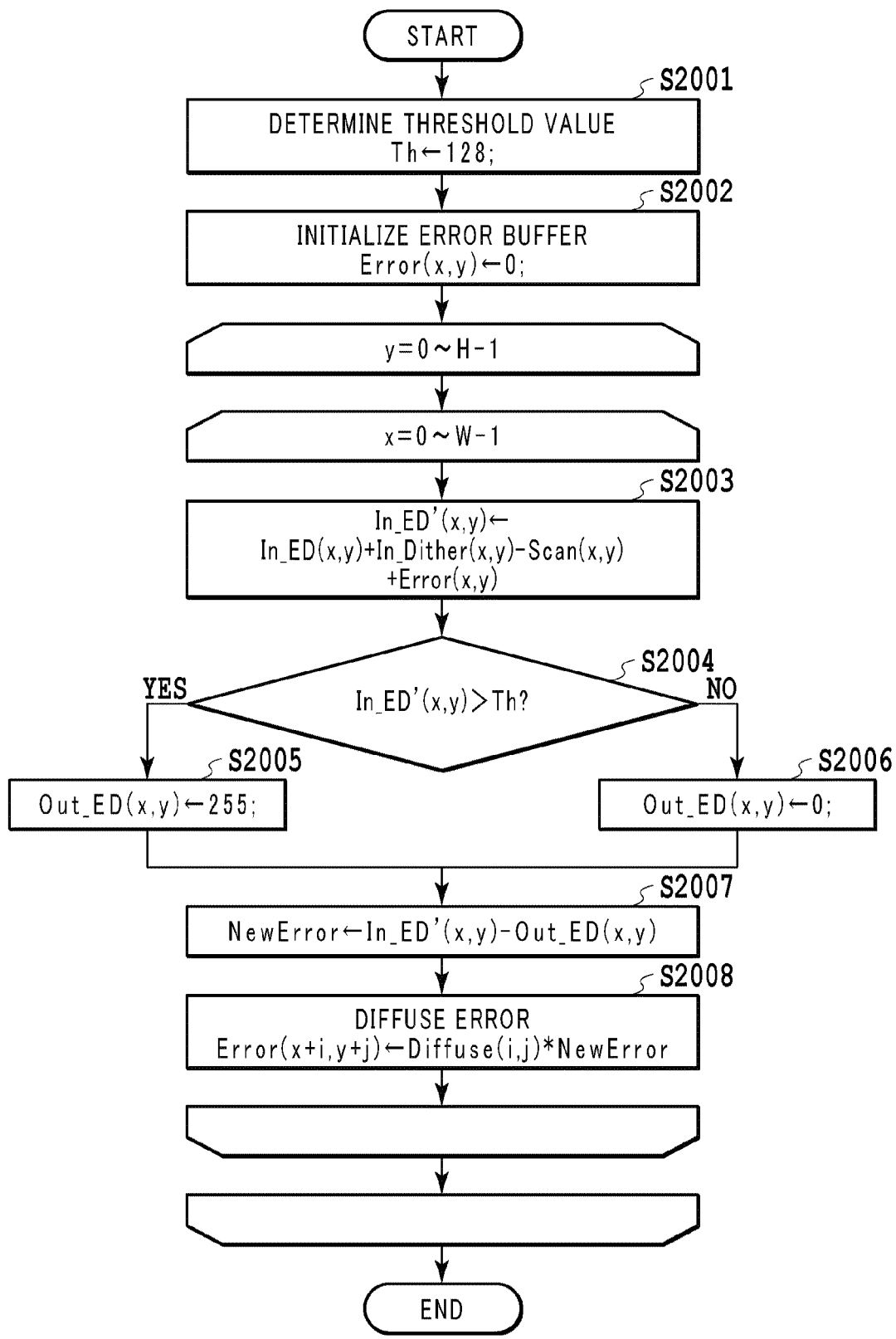
FIG. 20 is a flowchart related to the error diffusion method according to the ninth embodiment.

FIG. 20 is a flowchart showing a flow of the error diffusion processing according to the present embodiment. Each step of steps 901 to 908 in the flow in FIG. 9 according to the first embodiment corresponds to each step of steps 2001 to 2008 in the flow in FIG. 20. The flow in FIG. 20 differs from the flow in FIG. 9 in that Out_Dither (x, y) is used at step 903 in the first embodiment, but Scan (x, y) is used at step 2003. Here, Scan (x, y) indicates the density of the portion corresponding to the pixel position (x, y) on the printing medium, which is acquired by the printing density acquisition unit 1902. Because In_ED (x, y)+In_Dither (x, y) indicates the density of the original image, at step 2003, the error diffusion processing is performed by adding the error Error (x, y) to the difference between the acquired density of the image and the density of the original image as a result.

Although not shown in the flow in FIG. 20 because of not being processing in the halftone processing, it is assumed that Scan (x, y) that the printing density acquisition unit 1902 acquires is obtained by updating the density of scanned image data for each pixel. A scanner having a sensor capable of reading an image on a printing medium is provided in, for example, a print head (or a mechanism that performs a scan together with the print head) and at the time of a scan for image printing by the print head, the scanner reads the density on the printing medium in cooperation with the print head. Then, the information on the read density is acquired by the printing density acquisition unit 1902 and saved within a buffer as Scan (x, y). The attachment position of the scanner is not limited, but in the case of, for example, four-path printing, the scanner needs to be attached to a position where the density on the printing can be read after the printing of the first to third paths and before the printing of the fourth path.

By adopting the method such as this, even in the case where a dot arrangement different from the original dot arrangement is formed by the preceding paths due to a physical deviation, it is possible to generate a dot arrangement that takes the fact into consideration by the subsequent path, and therefore, it is possible to prevent degradation in image quality.

It may also be possible to input information on a theoretical dot arrangement (density) of the dither processing in the first halftone unit 502 to the second halftone unit 1903 so that the information is used in the error diffusion processing in the second halftone unit 1903. In other words, by comparing the theoretical dot arrangement with the actually printed density, the characteristics of the physical deviation that will occur in the nozzles related to printing, in the control mechanism, and in the printing medium are known, and then, the information is reflected in the dot arrangement as feedback.

Tenth Embodiment

Figure 17:
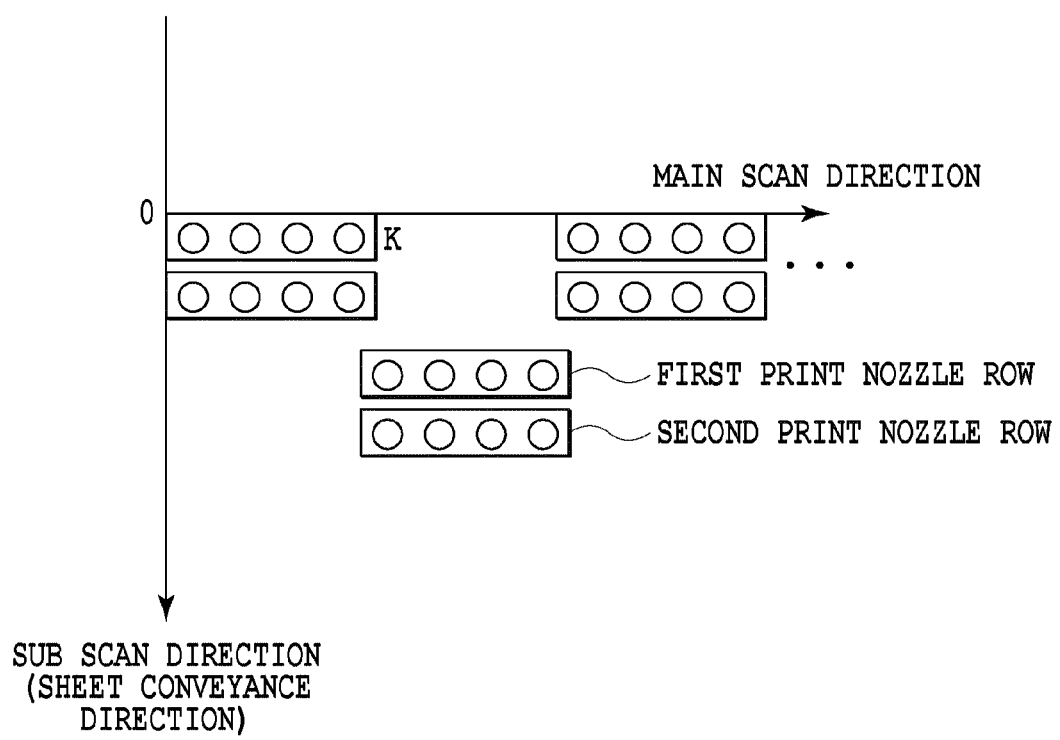
FIG. 17 is a schematic diagram explaining printing by a multi-row head system.

In the above embodiments, explanation is given by supposing the image forming apparatus adopting the multipath system. However, the image forming apparatus may be an image forming apparatus adopting a so-called multi-row head system having a plurality of printing element rows. FIG. 17 is a schematic diagram explaining printing by the multi-row head system. In this system, a plurality of printing element rows including a plurality of printing elements is put side by side in the main scan direction and has a sufficient length, and an image is formed in the area in the conveyance direction of a printing medium (sub scan direction) by the printing element rows aligned in the sub scan direction performing printing a plurality of times. In FIG. 17, the horizontal axis represents the main scan direction because a convenient comparison with the multipath system is taken into consideration, and the print head of this type does not necessarily need to perform a scan in the main scan direction. In this case, it is possible to apply the present invention by regarding the printing by the first printing element row as the first path and therefore the dither processing is performed and the printing by the second printing element row as the second path and therefore the error diffusion processing is performed. Further, it may also be possible to apply the present invention to the overlapped portion at each end of the printing element rows adjacent to each other in the main scan direction.

Other Embodiments

Further, the present invention may also be implemented by performing the following processing: software (programs) that implements the functions of the above-described embodiments is supplied to a system or an apparatus via a network or various kinds of storage media and a computer (or CPU, MPU, etc.) of the system or the apparatus reads and executes the programs.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-021335, filed Feb. 6, 2014, and No. 2014-233647, filed Nov. 18, 2014, which are hereby incorporated by reference wherein in their entirety.

What is claimed is:

1. An image processing apparatus that generates image data for forming an image by performing printing a plurality of times on the same area of a printing medium, the image processing apparatus comprising:

a division unit configured to divide the image data into first image data and second image data for each pixel constituting the image data so that the first image data includes pixels corresponding to those whose pixel value is equal to or greater than a predetermined threshold value among pixel values representing the pixels of the image data and the second image data includes pixels corresponding to those whose pixel value is a value less than the predetermined threshold value among the pixel values representing the pixels of the image data;

a first halftone processing unit configured to perform dither processing on the first image data; and a second halftone processing unit configured to perform error diffusion processing on the second image data.

2. The image processing apparatus according to claim 1, wherein the plurality of times is N times, the division unit further divides the image data including pixels whose pixel value is equal to or greater than the threshold value into image data corresponding to (N−1) times by performing division in a predetermined ratio, and the first halftone processing unit performs dither processing on each piece of the image data corresponding to the (N−1) times.

3. The image processing apparatus according to claim 1, wherein the second halftone processing unit performs the second halftone processing based on the results of the first halftone processing by the first halftone processing unit.

4. The image processing apparatus according to claim 1, wherein
the image data corresponding to the plurality of times of printing is subjected to processing by one of the first halftone processing unit and the second halftone processing unit.

5. The image processing apparatus according to claim 1, comprising:
a density setting unit configured to set a density range for halftone processing; and
a unit configured to set image data that is generated by one of the halftone processing units and which is to be used in each of the plurality of times of printing in accordance with a density range set by the density setting unit.

6. The image processing apparatus according to claim 1, wherein
image data for a predetermined preceding printing of the plurality of times of printing is generated by the first halftone processing unit, and
image data for printing that follows the predetermined preceding printing of the plurality of times of printing is generated by the second halftone processing unit.

7. An image processing apparatus that generates image data for forming an image by performing printing a plurality of times on the same area of a printing medium, the image processing apparatus comprising:
a division unit configured to divide the image data into first image data and second image data for each pixel constituting the image data so that the first image data includes pixels corresponding to those whose pixel value is equal to or greater than a predetermined threshold value among pixel values representing the pixels of the image data and the second image data includes pixels corresponding to those whose pixel value is a value less than the predetermined threshold value among the pixel values representing the pixels of the image data;
a first halftone processing unit configured to perform dither processing on the first image data; and
a second halftone processing unit configured to perform, on the second image data, halftone processing to determine a value of a pixel of interest based on the pixel of interest and pixels adjacent to the pixel of interest.

8. The image processing apparatus according to claim 7, wherein
the halftone processing by the second halftone processing unit is mean density approximation processing.

9. An image processing apparatus that generates image data for forming an image by performing printing N times on the same area of a printing medium, the image processing apparatus comprising:
a division unit configured to divide the image data into image data corresponding to the N times of printing by dividing the image data for each pixel constituting the image data;
a first halftone processing unit configured to generate first halftone image data corresponding to (N−α) times by performing dither processing on image data corresponding to (N−α) times of the image data corresponding to the N times of printing;
a second halftone processing unit configured to generate second halftone image data corresponding to α times by performing error diffusion processing on image data corresponding to α times of the image data corresponding to the N times of printing; and
a control unit configured to control printing based on the second halftone image data corresponding to the α and the first halftone image data corresponding to the (N−α), wherein
the control unit causes the first halftone image data to be printed prior to the second halftone image data.

10. The image processing apparatus that generates image data for forming an image by performing printing N times on the same area of a printing medium, the image processing apparatus comprising:
a division unit configured to divide the image data into image data corresponding to the N times of printing by dividing the image data for each pixel constituting the image date;
a first halftone processing unit configured to generate first halftone image data corresponding to (N−α) times by performing dither processing on image data corresponding to (N−α) times of the image data corresponding to the N times of printing;
a detection unit configured to detect results of printing the first halftone image data; and
a correction unit configured to correct the second image data based on the results of the detection unit,
a second halftone processing unit configured to generate second halftone image data corresponding to α times by performing error diffusion processing on image data corresponding to α times of the image data corresponding to the N times of printing;
a control unit configured to control printing based on the second halftone image data corresponding to the α and the first halftone image data corresponding to the (N−α), wherein
the control unit causes the first halftone image data to be printed prior to the second halftone image data; and
wherein the second halftone processing unit performs error diffusion processing on the second image data that is corrected by the correction unit.

11. The image processing apparatus according to claim 1, further comprising a printing density acquisition unit configured to read a density of an image printed on a printing medium, wherein
the second halftone processing unit performs halftone processing based on the density of the image printed on the printing medium, which is read by the printing density acquisition unit
further comprising a printing density acquisition unit configured to read a density of a color of an image printed on a printing medium,
wherein the second halftone processing unit performs halftone processing based on the density of the color of the image printed on the printing medium, which is read by the printing density acquisition unit.

12. An image forming apparatus that comprises the image processing apparatus according to claim 1 and which forms an image by performing printing a plurality of times on the same area of a printing medium.

13. The image forming apparatus according to claim 12, wherein
the plurality of times of printing is performed by using the same color material.

14. The image forming apparatus according to claim 12, wherein
an image is formed by causing a print head having a plurality of printing elements to scan the same area of the printing medium a plurality of times.

15. The image forming apparatus according to claim 12, wherein an image is formed by a plurality of printing element rows, each of which includes a plurality of printing elements put side by side in a main scan direction, performing printing, respectively, on an area in a sub scan direction of the recording medium.

16. An image processing method of generating image data for forming an image by performing printing a plurality of times on the same area of a printing medium, the image processing method comprising:

a step of dividing the image data into first image data and second image data for each pixel constituting the image data so that the first image data includes pixels corresponding to those whose pixel value is equal to or greater than a predetermined threshold value among pixel values representing the pixels of the image data and the second image data includes pixels corresponding to those whose pixel value is a value is less than the predetermined threshold value among the pixel values representing the pixels of the image data;

a first halftone processing step of performing dither processing on the first image data; and a second halftone processing step of performing error diffusion processing on the second image data.

17. An image processing method of generating image data for forming an image by performing printing a plurality of times on the same area of a printing medium, the image processing method comprising:

a step of dividing the image data into first image data and second image data for each pixel constituting the image data so that the first image data includes pixels corresponding to those whose pixel value is equal to or greater than a predetermined threshold value among pixel values representing the pixels of the image data and the second image data includes pixels corresponding to those whose pixel value is a value less than the predetermined threshold value among the pixel values representing the pixels of the image data;

a first halftone processing step of performing dither processing on the first image data; and a second halftone processing step of performing, on the second image data, halftone processing to determine a value of a pixel of interest based on the pixel of interest and pixels adjacent to the pixel of interest.

18. An image processing method of generating image data for forming an image by performing printing N times on the same area of a printing medium, the image processing method comprising:

a step of dividing the image data into image data corresponding to the N times of printing by dividing the image data for each pixel constituting the image data;

a first halftone processing step of generating first halftone image data corresponding to (N−α) times by performing dither processing on image data corresponding to (N−α) times of the image data corresponding to the N times of printing;

a second halftone processing step of generating second halftone image data corresponding to α times by performing error diffusion processing on image data corresponding to α times of the image data corresponding to the N times of printing; and a control step of controlling printing based on the second halftone image data corresponding to the α and the first halftone image data corresponding to the (N−α), wherein in the control step, the first halftone image data is printed prior to the second halftone image data.

19. A non-transitory computer readable storage medium storing a program for causing a computer to perform an image processing method of generating image data for forming an image by performing printing a plurality of times on the same area of a printing medium, the image processing method comprising:

a step of dividing the image data into first image data and second image data for each pixel constituting the image data so that the first image data includes pixels corresponding to those whose pixel value is a value equal to or greater than a predetermined threshold value among pixel values representing the pixels of the image data and the second image data includes pixels corresponding to those whose pixel value is a value less than the predetermined threshold value among the pixel values representing the pixels of the image data;

a first halftone processing step of performing dither processing on the first image data; and a second halftone processing step of performing, on the second image data, halftone processing to determine a value of a pixel of interest based on the pixel of interest and pixels adjacent to the pixel of interest.

20. The image forming apparatus that comprises the image processing apparatus according to claim 1, wherein in a case where the plurality of times are N times, image data corresponding to (N−α) times of printing is generated based on a result of processing by the first halftone processing unit, image data corresponding to α times of printing is generated based on a result of processing by the second halftone processing unit, and (N−α)>α.

* * * * *